United States Patent
Cozzo et al.

(10) Patent No.: US 12,143,937 B2
(45) Date of Patent: Nov. 12, 2024

(54) METHODS AND APPARATUSES FOR ENABLING DM-RS FILTERING WITHIN A TIME PERIOD

(71) Applicant: Samsung Electronics Co., Ltd., Suwon-si (KR)

(72) Inventors: Carmela Cozzo, San Diego, CA (US); Aristides Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 447 days.

(21) Appl. No.: 17/652,670

(22) Filed: Feb. 25, 2022

(65) Prior Publication Data
US 2022/0279455 A1    Sep. 1, 2022

Related U.S. Application Data

(60) Provisional application No. 63/301,010, filed on Jan. 19, 2022, provisional application No. 63/297,559, (Continued)

(51) Int. Cl.
*H04W 52/14*    (2009.01)
*H04W 72/1268*    (2023.01)

(52) U.S. Cl.
CPC ..... *H04W 52/146* (2013.01); *H04W 72/1268* (2013.01)

(58) Field of Classification Search
CPC ........... H04W 52/146; H04W 72/1268; H04W 52/08; H04W 52/221; H04W 52/54; H04W 72/0446; H04W 72/0453
See application file for complete search history.

(56) References Cited

U.S. PATENT DOCUMENTS

| | | | |
|---|---|---|---|
| 2012/0282970 A1* | 11/2012 | Kela | H04W 52/248 455/522 |
| 2015/0018030 A1 | 1/2015 | Park et al. | |
| 2016/0029392 A1 | 1/2016 | Hwang et al. | |

FOREIGN PATENT DOCUMENTS

KR    10-2014-0128968 A    11/2014

OTHER PUBLICATIONS

ZTE, "Summary2 for AI 7.1.5 Maintenance for UL power control", 3GPP TSG RAN WG1 Meeting 96, R1-1903458, Feb. 25, 2019-Mar. 1, 2019. (Year: 2019).*

(Continued)

*Primary Examiner* — Khoa Huynh

(57) ABSTRACT

Methods and apparatuses for use in a wireless communication. A method includes receiving first information providing first transmit power control (TPC) commands and second information providing a first number of slots for a transmission of a channel. The method further includes determining: a first set and a second set of transmission occasions for the channel over the first number of slots, a first power based on a first power control adjustment state, an accumulated value of the first TPC commands, a second power control adjustment state based on the first power control adjustment state and the accumulated value of the first TPC commands, and a second power based on the second power control adjustment state. The method further includes transmitting the channel with the first power in the transmission occasions of the first set and the second power in the transmission occasions of the second set.

20 Claims, 17 Drawing Sheets

Related U.S. Application Data filed on Jan. 7, 2022, provisional application No. 63/218,714, filed on Jul. 6, 2021, provisional application No. 63/155,134, filed on Mar. 1, 2021.

(56) References Cited

OTHER PUBLICATIONS

CATT, "Discussion on potential enhancements to PUSCH", 3GPP TSG RAN WG1 Ad-Hoc Meeting 1901, R1-1900333, Jan. 21-25, 2019 (Year: 2019).*

"3rd Generation Partnership Project; Technical Specification Group Radio Access Network; NR; Physical channels and modulation (Release 16)", 3GPP TS 38.211 V16.0.0, Dec. 2019, 129 pages.

"3rd Generation Partnership Project; Technical Specification Group Radio Access Network; NR; Multiplexing and channel coding (Release 16)", 3GPP TS 38.212 V16.0.0, Dec. 2019, 145 pages.

"3rd Generation Partnership Project; Technical Specification Group Radio Access Network; NR; Physical layer procedures for control (Release 16)", 3GPP TS 38.213 V16.0.0, Dec. 2019, 146 pages.

"3rd Generation Partnership Project; Technical Specification Group Radio Access Network; NR; Physical layer procedures for data (Release 16)", 3GPP TS 38.214 V16.0.0, Dec. 2019, 147 pages.

"5G; NR; Medium Access Control (MAC) protocol specification (3GPP TS 38.321 version 15.8.0 Release 15)", ETSI TS 138 321 V15.8.0, Jan. 2020, 80 pages.

"5G; NR; Radio Resource Control (RRC); Protocol specification (3GPP TS 38.331 version 15.8.0 Release 15)", ETSI TS 138 331 V15.8.0, Jan. 2020, 527 pages.

International Search Report and Written Opinion issued Jun. 16, 2022 regarding International Application No. PCT/KR2022/002891, 7 pages.

ZTE, "Summary2 for AI 7.1.5 Maintenance for UL power control", 3GPP TSG RAN WG1 Meeting #96, R1-1903458, Feb. 2019, 26 pages.

CATT, "Discussion on potential enhancements to PUSCH", 3GPP TSG RAN WG1 Ad-Hoc Meeting 1901, R1-1900333, Jan. 2019, 4 pages.

ETRI, "PUSCH coverage enhancement", 3GPP TSG RAN WG1 #103, R1-2007989, Oct. 2020, 3 pages.

\* cited by examiner

METHODS AND APPARATUSES FOR ENABLING DM-RS FILTERING WITHIN A TIME PERIOD

CROSS-REFERENCE TO RELATED APPLICATION AND CLAIM OF PRIORITY

This application claims priority under 35 U.S.C. § 119(e) to U.S. Provisional Patent Application No. 63/155,134 filed on Mar. 1, 2021; U.S. Provisional Patent Application No. 63/218,714 filed on Jul. 6, 2021; U.S. Provisional Patent Application No. 63/297,559 filed on Jan. 7, 2022; and U.S. Provisional Patent Application No. 63/301,010 filed on Jan. 19, 2022. The above-identified provisional patent applications are hereby incorporated by reference in their entirety.

TECHNICAL FIELD

The present disclosure relates generally to wireless communication systems and, more specifically, the present disclosure relates to enabling demodulation reference signal (DM-RS) filtering within a time period.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

This disclosure relates to enabling DM-RS filtering within a time period.

In one embodiment, a user equipment (UE) is provided. The UE includes a transceiver configured to receive first information providing first transmit power control (TPC) commands, and second information providing a first number of slots for a transmission of a channel. The UE further includes a processor operably coupled to a transceiver. The processor is configured to determine: a first set and a second set of transmission occasions for the channel over the first number of slots, a first power based on a first power control adjustment state that is associated with a first transmission occasion of the first set of transmission occasions, an accumulated value of the first TPC commands, a second power control adjustment state, associated with a first transmission occasion of the second set of transmission occasions, based on the first power control adjustment state and the accumulated value of the first TPC commands, and a second power based on the second power control adjustment state. The first TPC commands are received within the first set of transmission occasions. The transceiver is further configured to transmit the channel with the first power in the transmission occasions of the first set, and the second power in the transmission occasions of the second set.

In another embodiment, a base station (BS) is provided. The BS includes a transceiver configured to transmit first information providing first TPC commands, and second information providing a first number of slots for a reception of a channel. The BS further includes a processor operably coupled to a transceiver, the processor configured to determine: a first set and a second set of reception occasions for the channel over the first number of slots, a first power based on a first power control adjustment state that is associated with a first reception occasion of the first set of reception occasions, an accumulated value of the first TPC commands, a second power control adjustment state, associated with a first reception occasion of the second set of reception occasions, based on the first power control adjustment state and the accumulated value of the first TPC commands, and a second power based on the second power control adjustment state. The first TPC commands are transmitted within the first set of reception occasions. The transceiver is further configured to receive the channel with the first power in the reception occasions of the first set, and the second power in the reception occasions of the second set.

In yet another embodiment, a method is provided. The method includes receiving first information providing first TPC commands and second information providing a first number of slots for a transmission of a channel. The method further includes determining: a first set and a second set of transmission occasions for the channel over the first number of slots, a first power based on a first power control adjustment state that is associated with a first transmission occasion of the first set of transmission occasions, an accumulated value of the first TPC commands, a second power control adjustment state, associated with a first transmission occasion of the second set of transmission occasions, based on the first power control adjustment state and the accumulated value of the first TPC commands, and a second power based on the second power control adjustment state. The first TPC commands are received within the first set of transmission occasions. The method further includes transmitting the channel with the first power in the transmission occasions of the first set and the second power in the transmission occasions of the second set.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
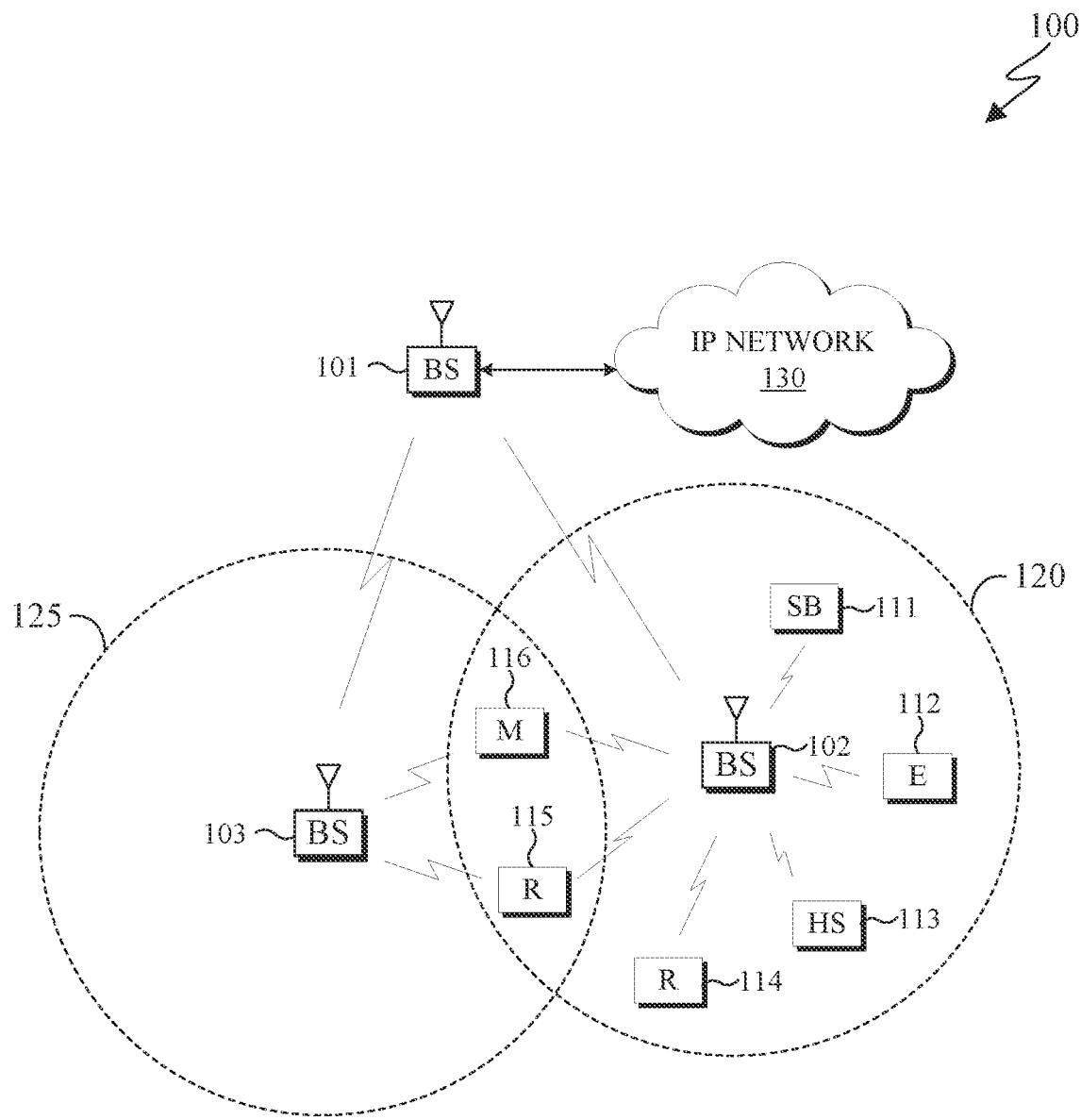
FIG. 1 illustrates an example wireless network according to embodiments of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged system or device.

The following documents are hereby incorporated by reference into the present disclosure as if fully set forth herein: 3GPP TS 38.211 v16.0.0, "NR; Physical channels and modulation" ("REF1"); 3GPP TS 38.212 v16.0.0, "NR; Multiplexing and channel coding" ("REF2"); 3GPP TS 38.213 v16.0.0, "NR; Physical layer procedures for control" ("REF3"); 3GPP TS 38.214 v16.0.0, "NR; Physical layer procedures for data" ("REF4"); 3GPP TS 38.321 v15.8.0, "NR; Medium Access Control (MAC) Protocol Specification" ("REF5"); and 3GPP TS 38.331 v15.8.0, "NR; Radio Resource Control (RRC) Protocol Specification" ("REF6").

To meet the demand for wireless data traffic having increased since deployment of the fourth generation (4G) communication systems, efforts have been made to develop and deploy an improved 5th generation (5G) or pre-5G/NR communication system. Therefore, the 5G or pre-5G communication system is also called a "beyond 4G network" or a "post long term evolution (LTE) system."

The 5G communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, coordinated multi-points (CoMP), reception-end interference cancelation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

Depending on the network type, the term 'base station' (BS) can refer to any component (or collection of components) configured to provide wireless access to a network, such as transmit point (TP), transmit-receive point (TRP), an enhanced base station (eNodeB or eNB), a gNB, a macrocell, a femtocell, a WiFi access point (AP), a satellite, or other wirelessly enabled devices. Base stations may provide wireless access in accordance with one or more wireless communication protocols, e.g., 5G 3GPP New Radio Interface/Access (NR), LTE, LTE advanced (LTE-A), High Speed Packet Access (HSPA), Wi-Fi 802.11a/b/g/n/ac, etc. The terms 'BS,' gNB,' and 'TRP' can be used interchangeably in this disclosure to refer to network infrastructure components that provide wireless access to remote terminals. Also, depending on the network type, the term 'user equipment' (UE) can refer to any component such as mobile station, subscriber station, remote terminal, wireless terminal, receive point, vehicle, or user device. For example, a UE could be a mobile telephone, a smartphone, a monitoring device, an alarm device, a fleet management device, an asset tracking device, an automobile, a desktop computer, an entertainment device, an infotainment device, a vending machine, an electricity meter, a water meter, a gas meter, a security device, a sensor device, an appliance, and the like.

Figure 2:
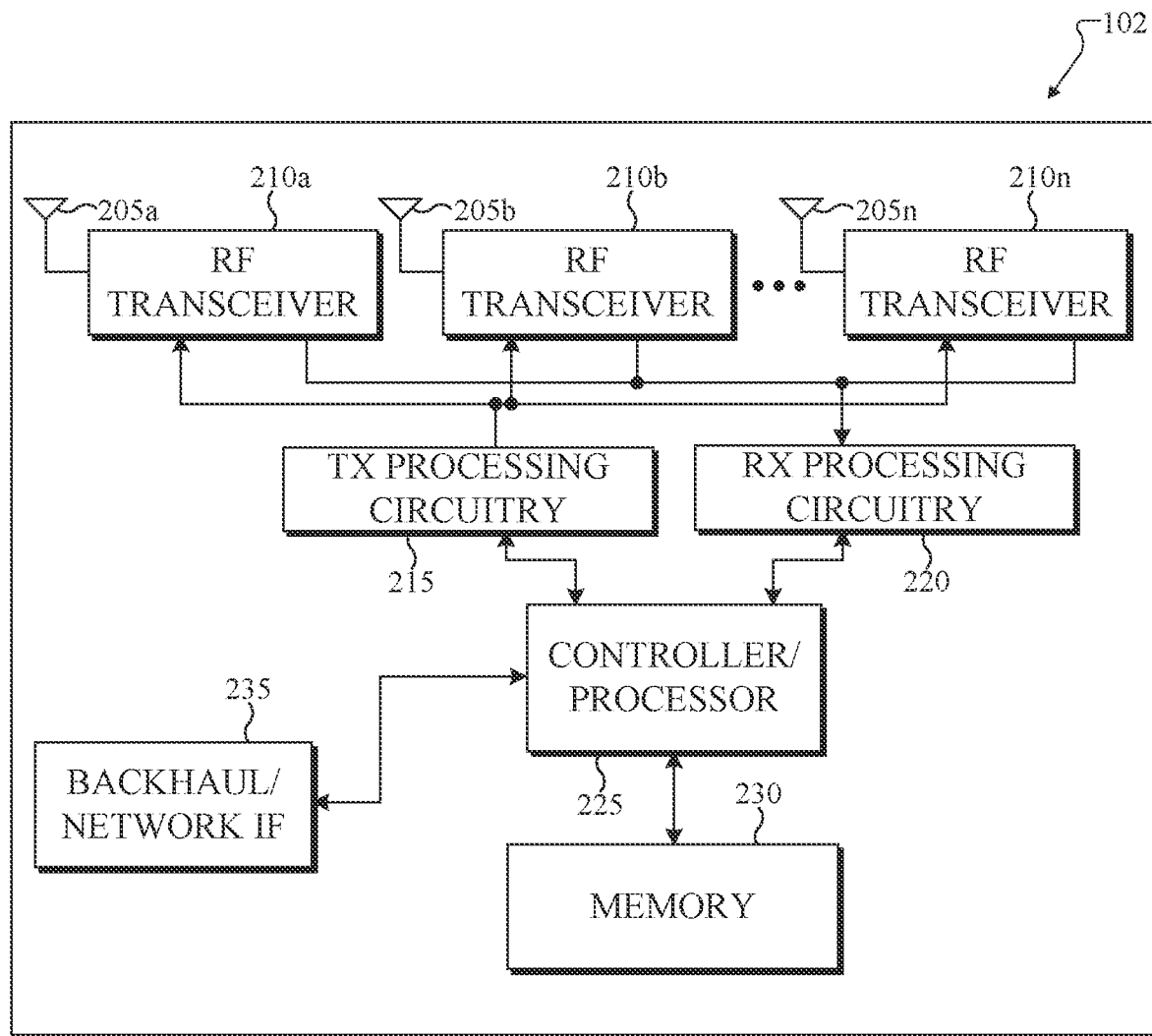
FIG. 2 illustrates an example BS according to embodiments of the present disclosure.
Figure 3:
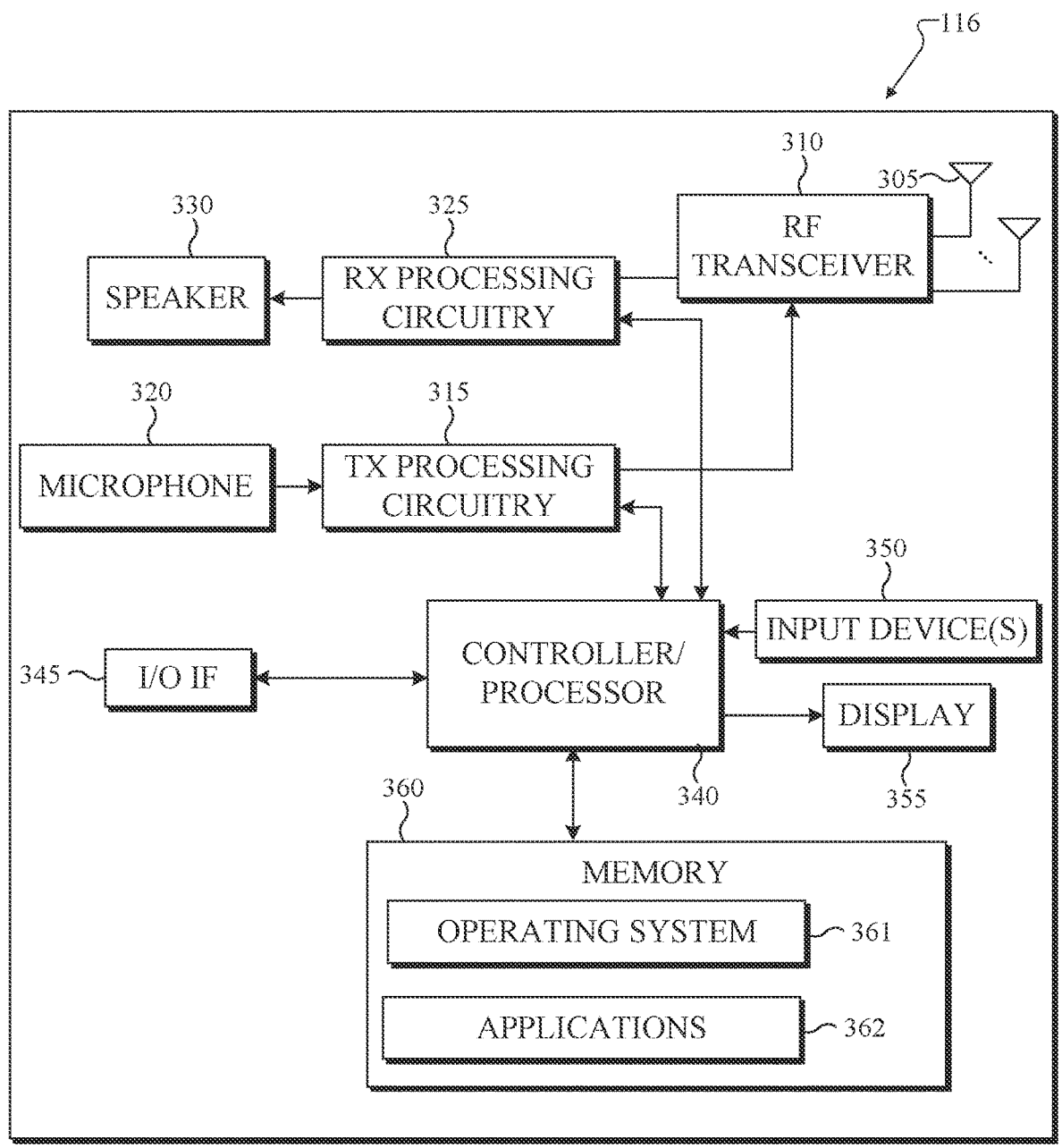
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes a base station, BS 101 (e.g., gNB), a BS 102, and a BS 103. The BS 101 communicates with the BS 102 and the BS 103. The BS 101 also communicates with at least one network 130, such as the Internet, a proprietary Internet Protocol (IP) network, or other data network.

The BS 102 provides wireless broadband access to the network 130 for a first plurality of user equipment's (UEs) within a coverage area 120 of the BS 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G/NR, long term evolution (LTE), long term evolution-advanced (LTE-A), WiMAX, WiFi, or other wireless communication techniques.

Dotted lines show the approximate extents of the coverage areas 120 and 125, which are shown as approximately circular for the purposes of illustration and explanation only. It should be clearly understood that the coverage areas associated with BSs, such as the coverage areas 120 and 125, may have other shapes, including irregular shapes, depending upon the configuration of the BSs and variations in the radio environment associated with natural and man-made obstructions.

As described in more detail below, one or more of the UEs 111-116 include circuitry, programing, or a combination thereof for demodulation reference signal (DM-RS) filtering within a time period. In certain embodiments, and one or more of the BSs 101-103 includes circuitry, programing, or a combination thereof for DM-RS filtering within a time period.

Although FIG. 1 illustrates one example of a wireless network, various changes may be made to FIG. 1. For example, the wireless network could include any number of BSs and any number of UEs in any suitable arrangement. Also, the BS 101 could communicate directly with any number of UEs and provide those UEs with wireless broadband access to the network 130. Similarly, each BS 102-103 could communicate directly with the network 130 and provide UEs with direct wireless broadband access to the network 130. Further, the BSs 101, 102, and/or 103 could provide access to other or additional external networks, such as external telephone networks or other types of data networks.

FIG. 2 illustrates an example BS 102 according to embodiments of the present disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of a BS.

As shown in FIG. 2, the BS 102 includes multiple antennas 205a-205n, multiple radio frequency (RF) transceivers 210a-210n, transmit (TX) processing circuitry 215, and receive (RX) processing circuitry 220. The BS 102 also includes a controller/processor 225, a memory 230, and a backhaul or network interface 235.

The RF transceivers 210a-210n receive, from the antennas 205a-205n, incoming RF signals, such as signals transmitted by UEs in the wireless network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the BS 102. For example, the controller/processor 225 could control the reception of uplink channel signals and the transmission of downlink channel signals by the RF transceivers 210a-210n, the RX processing circuitry 220, and the TX processing circuitry 215 in accordance with well-known principles. The controller/processor 225 could support additional functions as well, such as more advanced wireless communication functions. Any of a wide variety of other functions could be supported in the BS 102 by the controller/processor 225. In some embodiments, the controller/processor 225 includes at least one microprocessor or microcontroller.

The controller/processor 225 is also capable of executing programs and other processes resident in the memory 230, such as an OS. The controller/processor 225 can move data into or out of the memory 230 as required by an executing process. In certain embodiments, the controller/processor 225 supports DM-RS filtering within a time period. The controller/processor 225 can move data into or out of the memory 230 according to a process that is being executed.

The controller/processor 225 is also coupled to the backhaul or network interface 235. The backhaul or network interface 235 allows the BS 102 to communicate with other devices or systems over a backhaul connection or over a network. The network interface 235 could support communications over any suitable wired or wireless connection(s). For example, when the BS 102 is implemented as part of a cellular communication system (such as one supporting 5G/NR, LTE, or LTE-A), the network interface 235 could allow the BS 102 to communicate with other BSs over a wired or wireless backhaul connection. When the BS 102 is implemented as an access point, the network interface 235 could allow the BS 102 to communicate over a wired or wireless local area network or over a wired or wireless connection to a larger network (such as the Internet). The network interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of BS 102, various changes may be made to FIG. 2. For example, the BS 102 could include any number of each component shown in FIG. 2. As a particular example, an access point could include a number of network interfaces 235, and the controller/processor 225 could support routing functions to route data between different network addresses. As another particular example, while shown as including a single instance of TX processing circuitry 215 and a single instance of RX processing circuitry 220, the BS 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a RF transceiver 310, TX processing circuitry 315, a microphone 320, and receive (RX) processing circuitry 325. The UE 116 also includes a speaker 330, a processor 340, an input/output (I/O) interface (IF) 345, an input device 350, a display 355, and a memory 360. The memory 360 includes an operating system (OS) 361 and one or more applications 362.

The RF transceiver 310 receives, from the antenna 305, an incoming RF signal transmitted by a BS of the wireless network 100. The RF transceiver 310 down-converts the incoming RF signal to generate an intermediate frequency (IF) or baseband signal. The IF or baseband signal is sent to the RX processing circuitry 325 that generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of uplink channel signals and the transmission of downlink channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from BSs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the input device 350. The operator of the UE 116 can use the input device 350 to enter data into the UE 116. The input device 350 can be a keyboard, touchscreen, mouse, track ball, voice input, or other device capable of acting as a user interface to allow a user in interact with the UE 116. For example, the input device 350 can include voice recognition processing, thereby allowing a user to input a voice command. In another example, the input device 350 can include a touch panel, a (digital) pen sensor, a key, or an ultrasonic input device. The touch panel can recognize, for example, a touch input in at least one scheme, such as a capacitive scheme, a pressure sensitive scheme, an infrared scheme, or an ultrasonic scheme.

The processor 340 is also coupled to the display 355. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
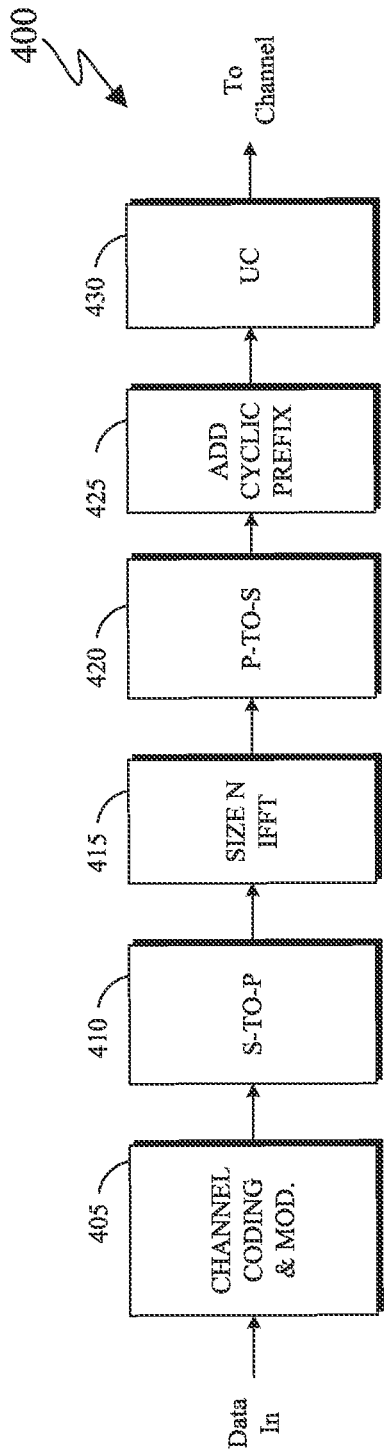
FIGS. 4 and 5 illustrate example wireless transmit and receive paths according to embodiments of the present disclosure.
Figure 5:
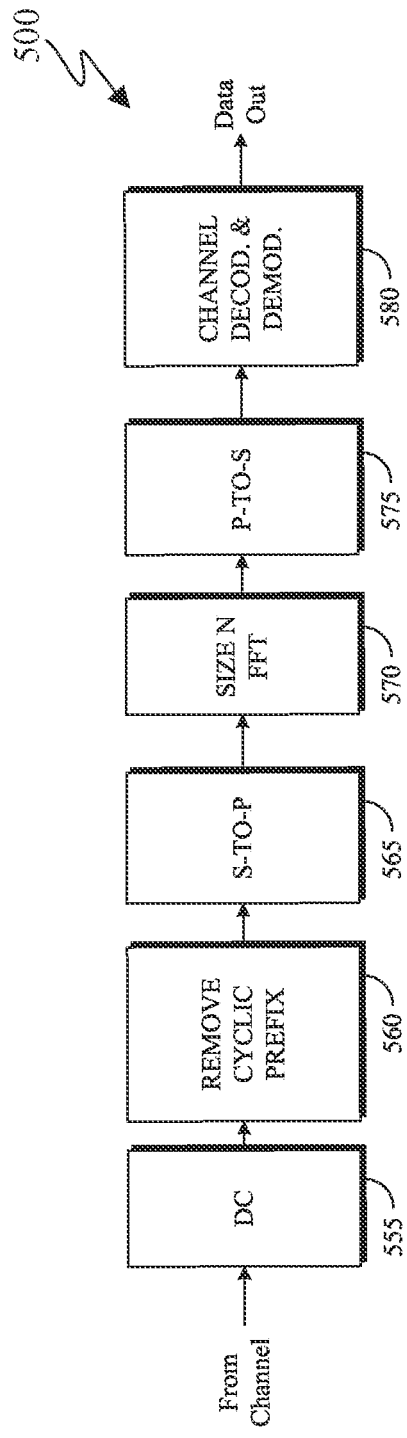

FIG. 4 and FIG. 5 illustrate example wireless transmit and receive paths according to this disclosure. In the following description, a transmit path 400, of FIG. 4, may be described as being implemented in a BS (such as the BS 102), while a receive path 500, of FIG. 5, may be described as being implemented in a UE (such as a UE 116). However, it may be understood that the receive path 500 can be implemented in a BS and that the transmit path 400 can be implemented in a UE. In some embodiments, the receive path 500 is configured to support DM-RS filtering within a time period as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 4, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols. The serial-to-parallel block 410 converts (such as de-multiplexes) the serial modulated symbols to parallel data in order to generate N parallel symbol streams, where N is the IFFT/FFT size used in the BS 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the BS 102 arrives at the UE 116 after passing through the wireless channel, and reverse operations to those at the BS 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the BSs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the BS s 101-103 and may implement the receive path 500 for receiving in the downlink from the BSs 101-103.

Each of the components in FIG. 4 and FIG. 5 can be implemented using hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In certain embodiments, a UE (such as the UE 116) includes a DM-RS in a physical uplink data channel (PUSCH) or in a physical uplink control channel (PUCCH) transmission in order to enable a receiver at a serving gNB (such as the BS 102) to coherently demodulate modulated data information symbols or control information symbols in the PUSCH or in the PUCCH. The DM-RS is typically located in the earlier symbols of a PUSCH or PUCCH transmission to avoid a demodulation delay due to a processing time for obtaining a channel estimate to be used for the coherent demodulation of data/control symbols under the assumption of phase coherence among the DM-RS and the data/control symbols.

Embodiments of the present disclosure take into consideration that inaccurate channel estimation can significantly degrade reception reliability of data/control information. A way to improve an accuracy of channel estimates is to filter multiple DM-RS across repetitions of a PUSCH transmission. In order to enable filtering over multiple DM-RS, a power and phase of the filtered DM-RS needs to remain practically same and that also applies to the power and phase of modulated data/control information symbols in order to perform demodulation using the filtered DM-RS.

A power for PUSCH and PUCCH transmissions is determined by uplink power control. A UE determines the power for the transmission in a transmission occasion, wherein the transmission occasion is defined by a slot index, a starting symbol and a number of consecutive symbols, based on a power control adjustment state that is updated based on received TPC commands. For example, for a PUSCH transmission in PUSCH transmission occasion i, the PUSCH power control adjustment state $f_{b,f,c}(i)$ for an active UL BWP b of carrier f of serving cell c in PUSCH transmission occasion i is given by a TPC command value $\delta_{PUSCH,b,f,c}(i)$ included in a DCI format that schedules the PUSCH transmission occasion i or jointly coded with other TPC commands in a DCI format 2_2 with CRC scrambled by TPC-PUSCH-RNTI. Thus, $f_{b,f,c}(i)=\delta_{PUSCH,b,f,c}(i)$.

A UE can be configured with accumulation of TPC commands enabled: if the UE is not provided tpc-Accumulation, i.e. tpc-Accumulation field is absent in a configuration of power control parameters for the PUSCH transmission, accumulation is enabled, and the UE applies TPC commands via accumulation. When accumulation is enabled, the UE power control adjustment state $f_{b,f,c}(i)$ in PUSCH transmission occasion i is based on an a power control adjustment state at an earlier transmission occasion $i-i_0$ and on a sum of TPC commands received in a time interval between the earlier transmission occasion $i-i_0$ and transmission occasion i, wherein the time interval is between $K_{PUSCH}(i-i_0)-1$ symbols before PUSCH transmission occasion $i-i_0$ and $K_{PUSCH}(i)$ symbols before PUSCH transmission occasion i, where $i_0>0$ is the smallest integer for which $K_{PUSCH}(i-i_0)$ symbols before PUSCH transmission occasion $i-i_0$ is earlier than $K_{PUSCH}(i)$ symbols before PUSCH transmission occasion i.

If the PUSCH transmission is scheduled by a DCI format, $K_{PUSCH}(i)$ is a number of symbols after a last symbol of a corresponding PDCCH reception including the DCI format and before a first symbol of the PUSCH transmission in PUSCH transmission occasion i.

If the PUSCH transmission scheduled by the DCI format is with repetitions, for a first PUSCH repetition in PUSCH transmission occasion i, $K_{PUSCH}(i)$ is a number of symbols after a last symbol of a corresponding PDCCH reception including the DCI format and before a first symbol of the first PUSCH repetition in PUSCH transmission occasion i. For a subsequent PUSCH repetition in transmission occasion i+j with j≥1, $K_{PUSCH}(i+j)$ is a number of symbols after the last symbol of the corresponding PDCCH reception including the DCI format and before a first symbol of the $j^{th}$ PUSCH repetition in PUSCH transmission occasion i+j. It is also possible that for the subsequent PUSCH repetition in transmission occasion i+j with j≥1, $K_{PUSCH}(i+j)$ is a number of symbols after the last symbol of the corresponding PDCCH reception including the DCI format and before the first symbol of the first PUSCH repetition in PUSCH transmission occasion i.

If the PUSCH transmission is configured by RRC parameter ConfiguredGrantConfig, $K_{PUSCH}(i)$ is a number of $K_{PUSCH,min}$ symbols equal to the product of a number of symbols per slot, $N_{symb}^{slot}$, and the minimum of the values provided by a minimum scheduling offset k2 provided in the PUSCH configuration for active UL BWP b of carrier f of serving cell c.

Embodiments of the present disclosure relate to enabling DM-RS filtering within a time period. The present disclosure also relates to a determination of a number of repetitions for a PUSCH or PUCCH transmission by a UE over which the UE transmits the repetitions with a same power and a same phase. The present disclosure further relates to the determination of a number of repetitions of a PUSCH transmission by a UE over which the UE applies a same redundancy version to an encoding of a transport block (TB). Additionally, the present disclosure relates to a UE procedure for determining a power for repetitions of a PUSCH or PUCCH transmission by a UE when the UE maintains a same power for a number of repetitions of the PUSCH or PUSCH transmission. The present disclosure also relates to determining by a UE redundancy versions (RVs) to encode a TB in respective repetitions of a PUSCH transmission. The present disclosure further relates to indicating a UE capability to transmit with DM-RS filtering.

That is, embodiments of the present disclosure describe of determining transmit power within a time window (can be same/different transmit power depending on TPC command). Embodiments of the present disclosure also describe signaling of a time window. Embodiments of the present disclosure further describe a UE capability to transmit with DM-RS filtering.

PUSCH repetitions can include a same or similar TB in each repetition or some of the repetitions can include different TBs, or a same or similar TB can be encoded and mapped to resource elements over multiple repetitions, wherein the multiple repetitions are transmitted over a corresponding number of slots and the number of slots can be consecutive or non-consecutive slots. For a PUCCH transmission with repetitions, a same control information can be provided in each repetition, or different control information can be provided in some repetitions, or same control information can be encoded and mapped to resource elements over multiple repetitions.

Modulated data or control information symbols that would be demodulated at a gNB (such as the BS 102) receiver using channel estimates that the gNB receiver obtains by filtering a number of DM-RS can be located in consecutive PUSCH or PUCCH symbols, or be separated by N symbols.

The operation of DM-RS filtering within a time period is also referred as DM-RS bundling over a time period or joint channel estimation over a time period throughout this disclosure. For a gNB (such as the BS 102) to apply DM-RS filtering within a time period, a UE (such as the UE 116) needs to apply certain conditions to the transmitted signal over a time period. For the UE to apply certain conditions to a transmission in a time period, the UE needs to be configured by the gNB for transmission with DM-RS bundling or joint channel estimation. Also, the UE can have the capability of applying certain conditions to the transmission in a time period when configured/indicated to do so.

Embodiments of the present disclosure describe signaling of a time window. This is described in the following examples and embodiments, such as those of FIG. 6.

Figure 6:
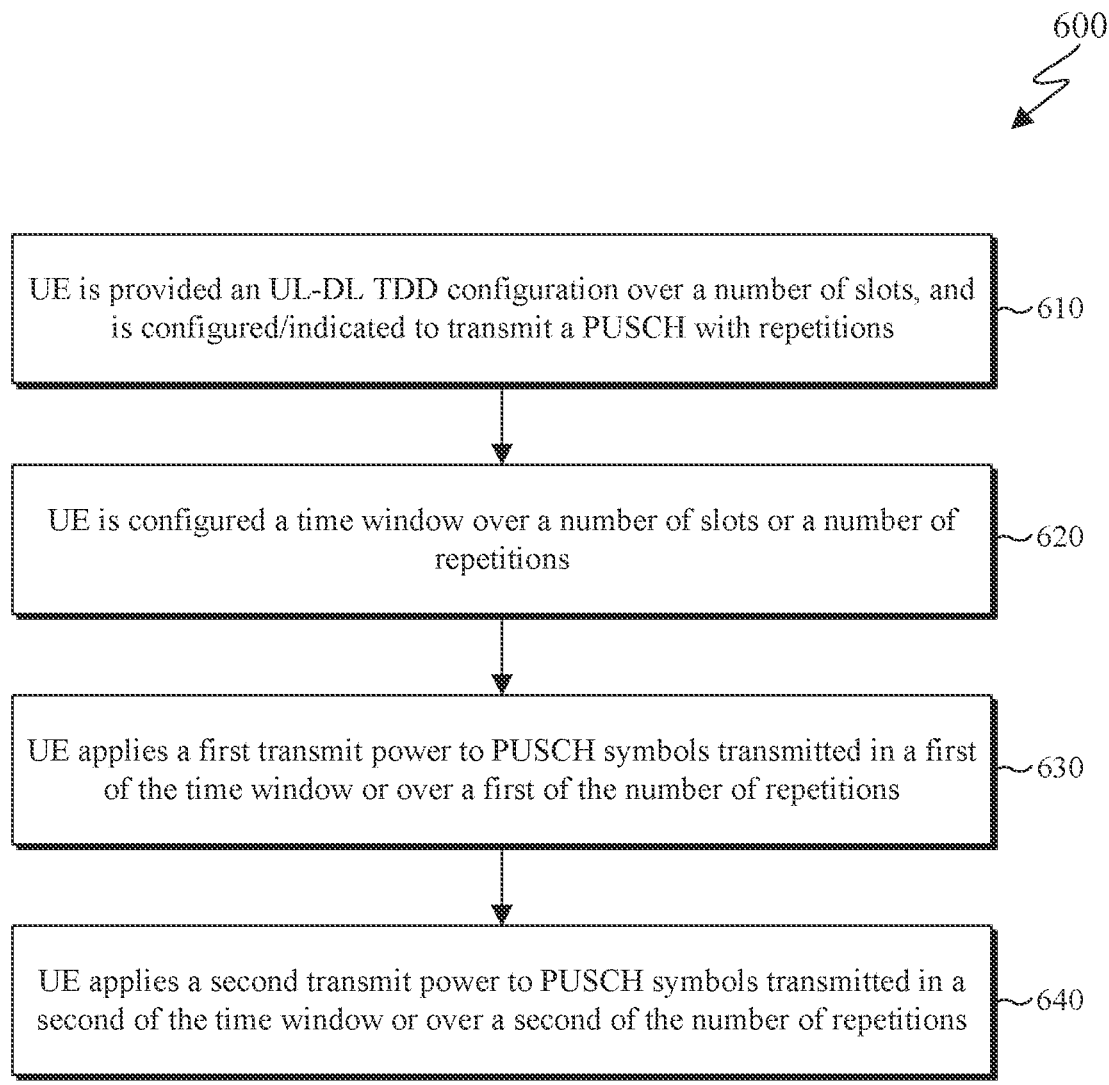
FIG. 6 illustrates an example method for determining a power for repetitions of a physical uplink control channel (PUSCH) transmission according to embodiments of the present disclosure.

FIG. 6 illustrates an example method 600 for determining a power for repetitions of a PUSCH transmission according to embodiments of the present disclosure.

The steps of the method 600 of FIG. 6 can be performed by any of the UEs 111-116 of FIG. 1, such as the UE 116 of FIG. 3. The method 600 is for illustration only and other embodiments can be used without departing from the scope of the present disclosure.

In certain embodiments, a gNB (such as the BS 102) signals a time window to a UE (such as the UE 116) by indicating a time period, such as a number of slots, or by indicating a number of repetitions of a PUSCH or PUCCH transmission over which the UE should apply conditions that result to a same phase and a same power for the repetitions over the time period or over the number of repetitions. The gNB can provide the indication by higher layers. The gNB can also provide to the UE multiple values for the time period or for the number of repetitions and indicate a value through a downlink control information (DCI) format scheduling the PUSCH or PUCCH transmission. For example, a 1-bit field in the DCI format can indicate a time period or a number of repetitions from a configured set of two time periods or two numbers of repetitions. For example, a time domain resource allocation (TDRA) table can include entries associated with different values of a time period or of number of repetitions that the UE should apply conditions that result to a same phase and a same power. For example, a first TDRA entry can indicate a set of symbols for a PUSCH transmission with repetitions and a first number of repetitions and a second TDRA entry can indicate the set of symbols for a PUSCH transmission with repetitions and a second number of repetitions for the UE to apply conditions that result to a same phase and a same power for the repetitions and a TDRA field in the DCI format can indicate the first or the second TDRA entry.

It is also possible that a gNB (such as the BS 102) configures a time window with a single length defined in a number of symbols or in a number of slots and a field in a DCI format indicates a start of the first time window. A timing relation between the indication in the DCI format and the start of the first time window can be defined to be in a same slot as a slot of a physical downlink control channel (PDCCH) reception with the DCI format, or in a first slot after the slot of the PDCCH reception with the DCI format, or in a first slot with a repetition of the PUSCH or PUCCH transmission.

For example, when a gNB (such as the BS 102) schedules a UE (such as the UE 116) to transmit a PUSCH with a number of repetitions, the gNB can also indicate a number of slots $N_w$ as a length of a time window. In this example, the number of slots can be same as or different from the number of PUSCH repetitions. For instance, for PUSCH repetitions type A, the length of the time window in number of slots can be same as the number of repetitions, and can be different for PUSCH repetitions type B. A gNB can indicate such value $N_w$ in a TDRA table, and it can be jointly coded with the number of repetitions or another field of the TDRA table.

For another example, when a gNB (such as the BS 102) schedules a UE (such as the UE 116) to transmit a PUSCH with a TB over multiple slots, the gNB can also indicate a number of slots as the length of the time window. In this example, the number can be same as or different than the number of slots over which the TB is transmitted. As described for a gNB scheduling PUSCH repetitions, indication in a DCI format scheduling the PUSCH transmission or in the TDRA table can be used.

For yet another example, when a gNB (such as the BS 102) schedules a UE (such as the UE 116) to transmit a PUSCH with a TB over multiple slots and with a number of repetitions, the number of slots over which the TB is transmitted or the number of slots over which the TB with repetitions is transmitted can be the length of the time window when a separate indication is not provided.

The conditions that the UE should apply to maintain a same power and phase over a time period or over a number of repetitions include for the UE to not apply accumulated transmit power control (TPC) commands or for the UE to maintain a same precoding or spatial filter for the repetitions. When the UE is not indicated a time period or a number of repetitions for the UE to apply a same transmission power or a same precoding or a same spatial filter, the determination can be specified in the system operation. For example, when all repetitions of a PUSCH or PUCCH transmission are in same frequency resources such as same resource blocks (RBs), the UE maintains a same transmission power or a same precoding or a same spatial filter over all repetitions of the PUSCH or PUCCH transmission. For a next PUSCH or PUCCH transmission, the UE can apply a current closed-loop power control state with the accumulated TPC command values or can change a precoding or a spatial filter for the next PUSCH or PUCCH transmission. For example, when frequency hopping applies, a same UE behavior as for the case of no frequency hopping can apply where instead of a number of repetitions being all repetitions, the number of repetitions is the one in each frequency hop before a next frequency hop. For example, the UE can apply a current closed-loop power control state with the accumulated TPC command values after the UE perform frequency hopping and continues with repetitions of the PUSCH or PUCCH repetitions over a new set of RBs.

The method 600 of FIG. 6 illustrates a procedure for a UE to determine a power for repetitions of a PUSCH transmission according to embodiments of this disclosure.

In step 610, a UE (such as the UE 116) is provided an uplink (UL)-downlink (DL) time division duplexing (TDD) configuration over a number of slots and is configured/indicated to transmit a PUSCH with repetitions. In step 620, the UE is configured/indicated a time window over a number of slots or a number of repetitions. In step 630, the UE applies a first transmit power to PUSCH symbols transmitted in a first of the time window or over a first of the number of repetitions. In step 640, the UE applies a second transmit power to PUSCH symbols transmitted in a second of the time window or over a second of the number of repetitions.

Although FIG. 6 illustrates the method 600 various changes may be made to FIG. 6. For example, while the method 600 is shown as a series of steps, various steps could overlap, occur in parallel, occur in a different order, or occur multiple times. In another example, steps may be omitted or replaced by other steps. For example, steps of the method 600 can be executed in a different order.

Embodiments of the present disclosure describe a determination of uplink transmissions with a same or similar transmit power in a time window. This is described in the following examples and embodiments, such as those of FIGS. 7-12.

Figure 7:
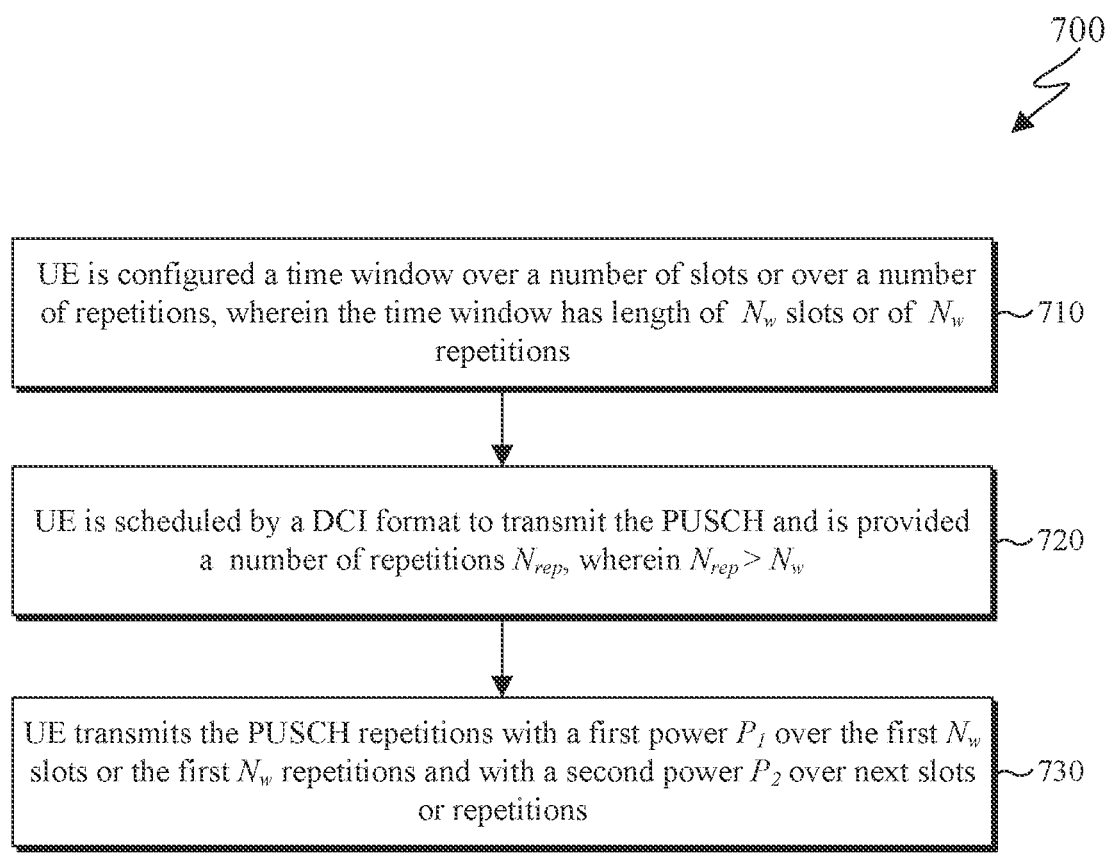
FIG. 7 illustrates an example method for determining a transmission power of PUSCH repetitions in a time window according to embodiments of the present disclosure.
Figure 8:
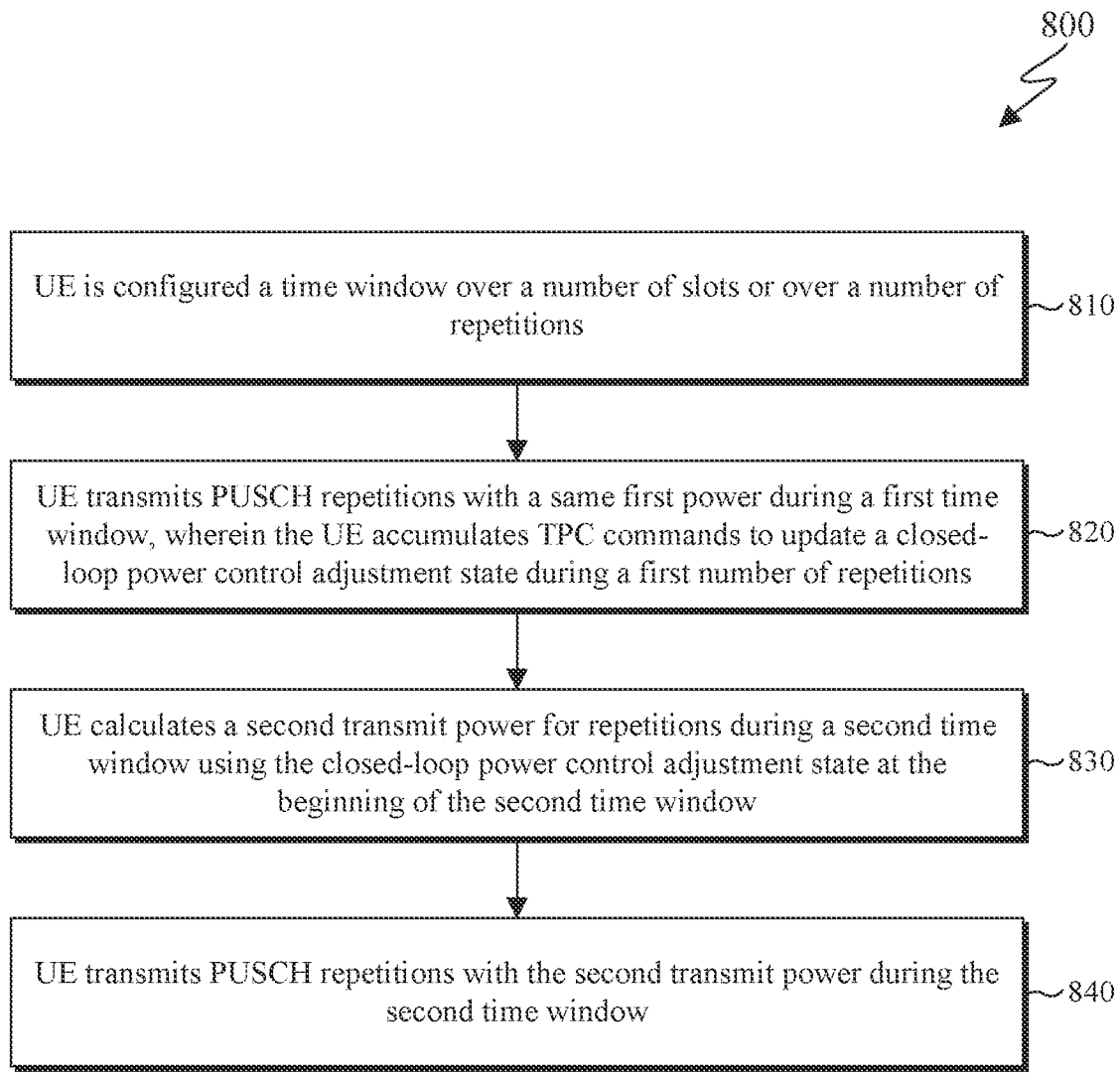
FIG. 8 illustrates an example method for calculating a transmit power during a second time window using TPC commands received during a first time window according to embodiments of the present disclosure.
Figure 9:
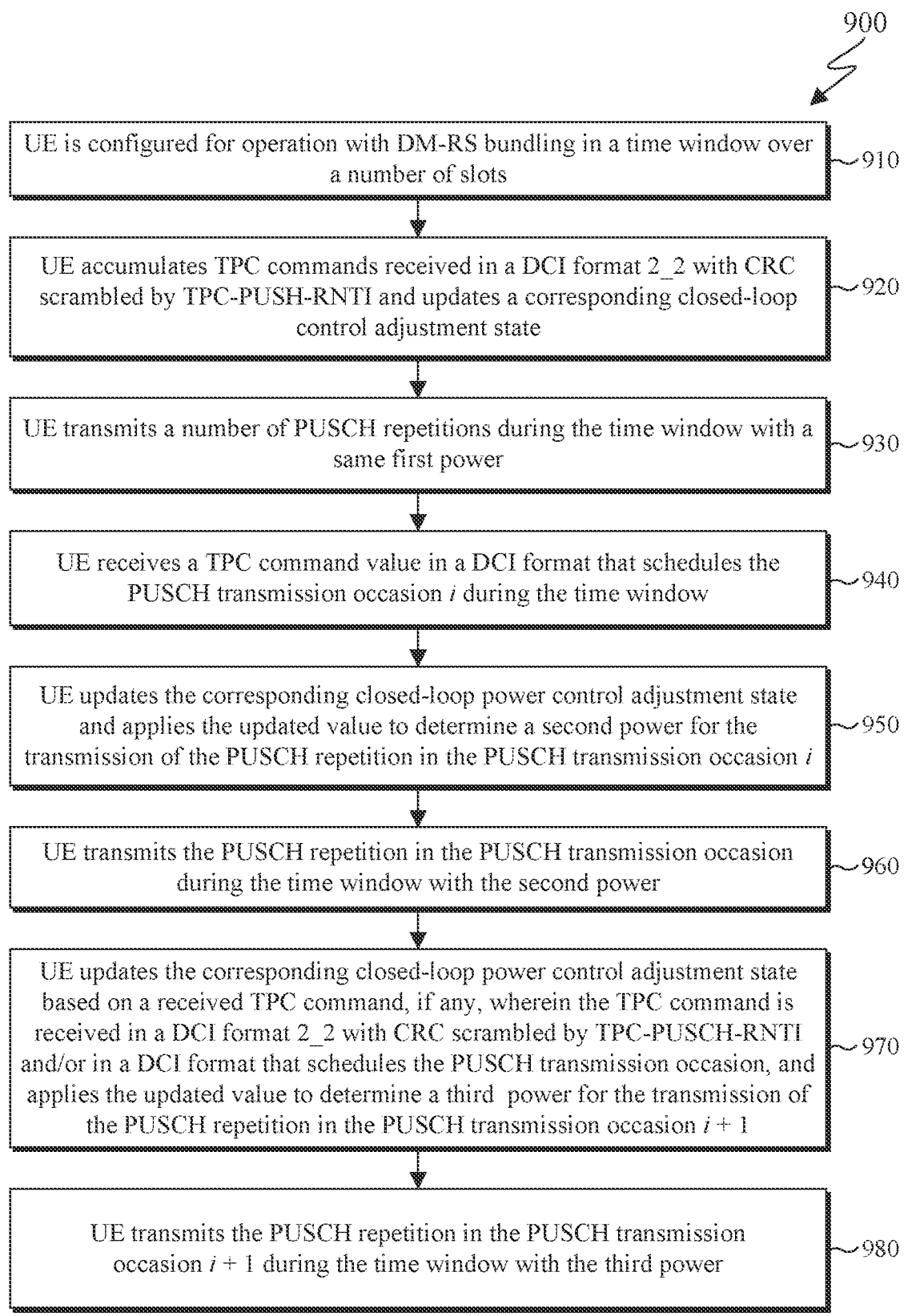
FIG. 9-11 illustrates example methods for determining a power of a PUSCH transmission during a time window according to embodiments of the present disclosure.
Figure 10:
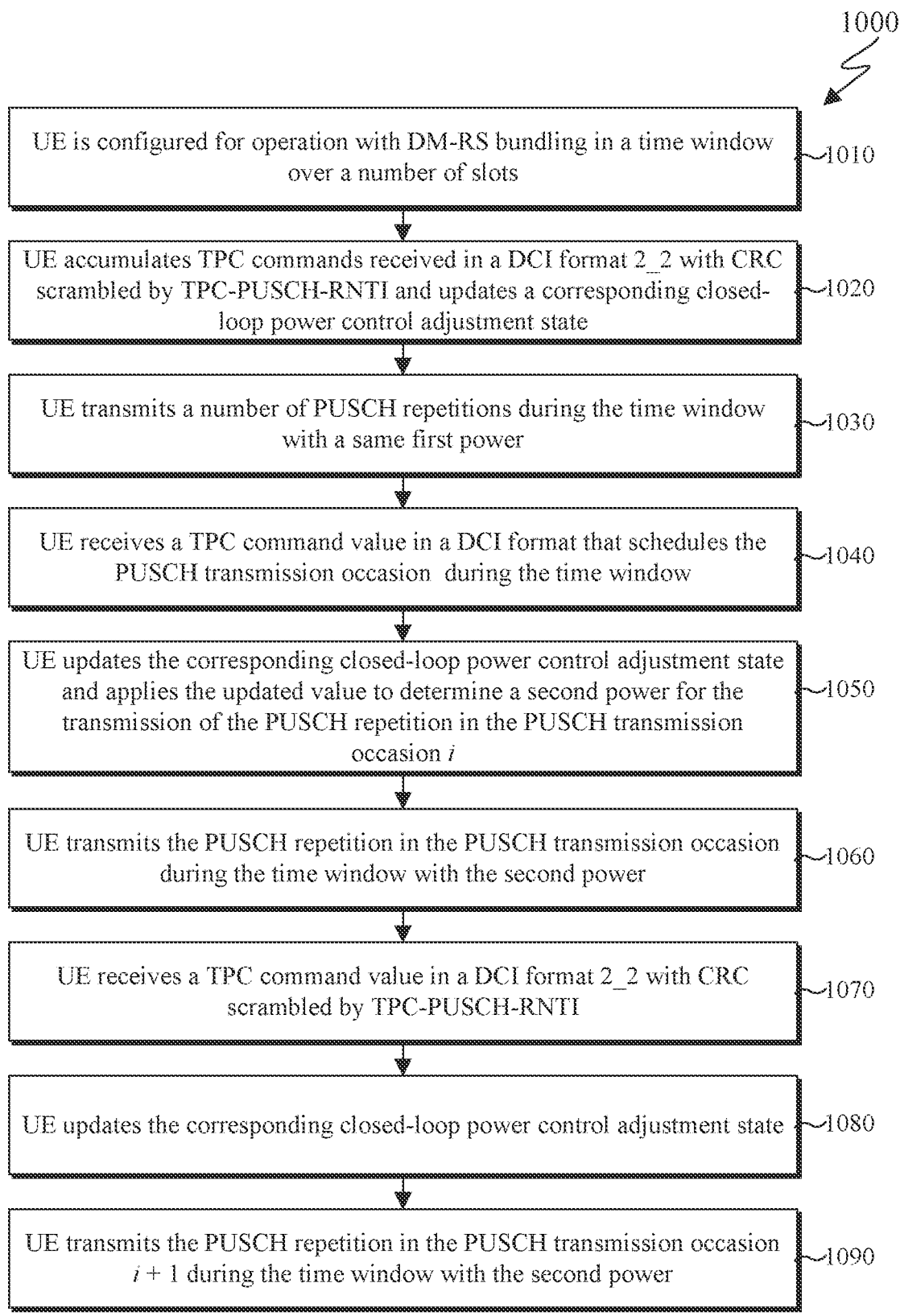
Figure 11:
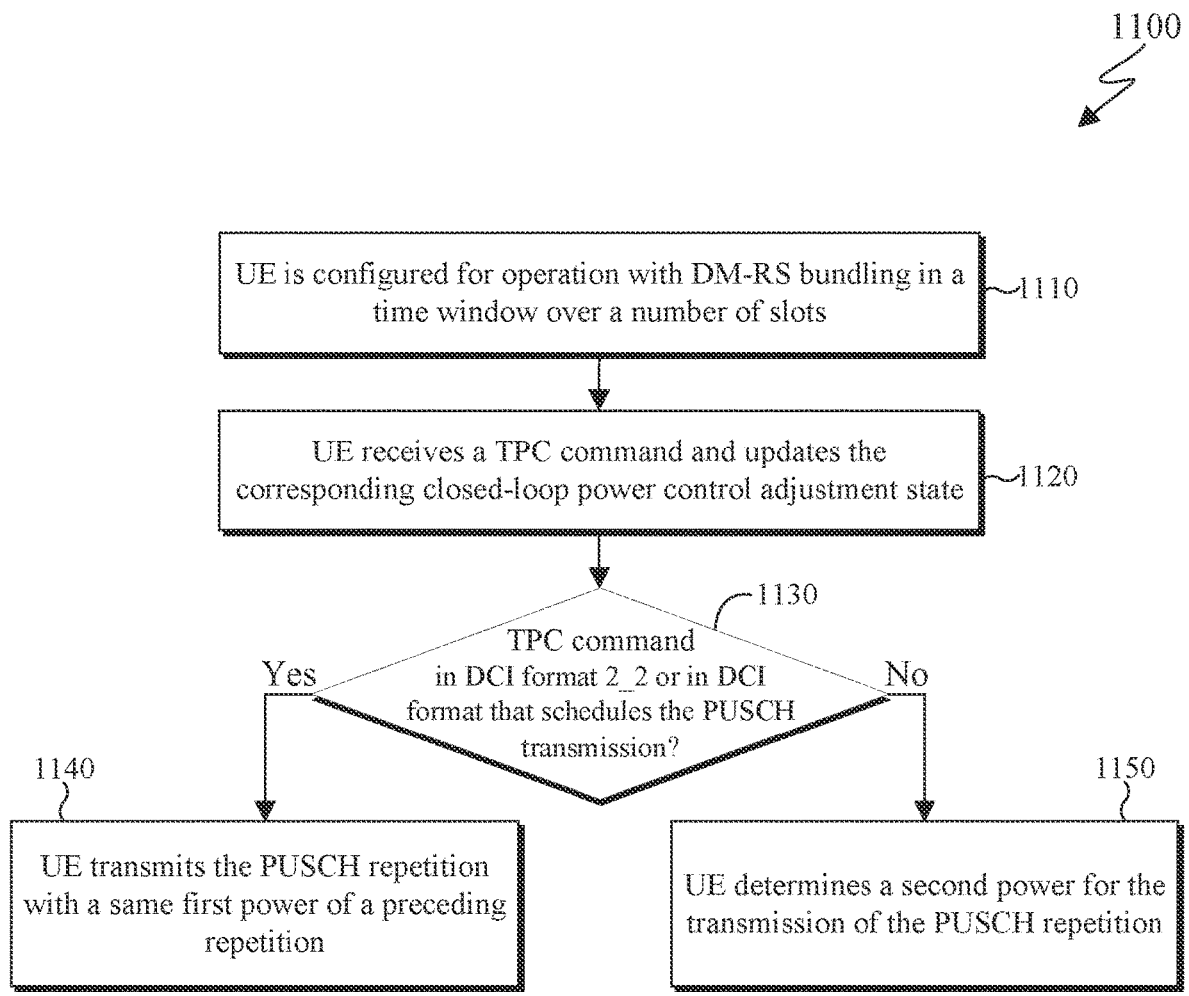
Figure 12:
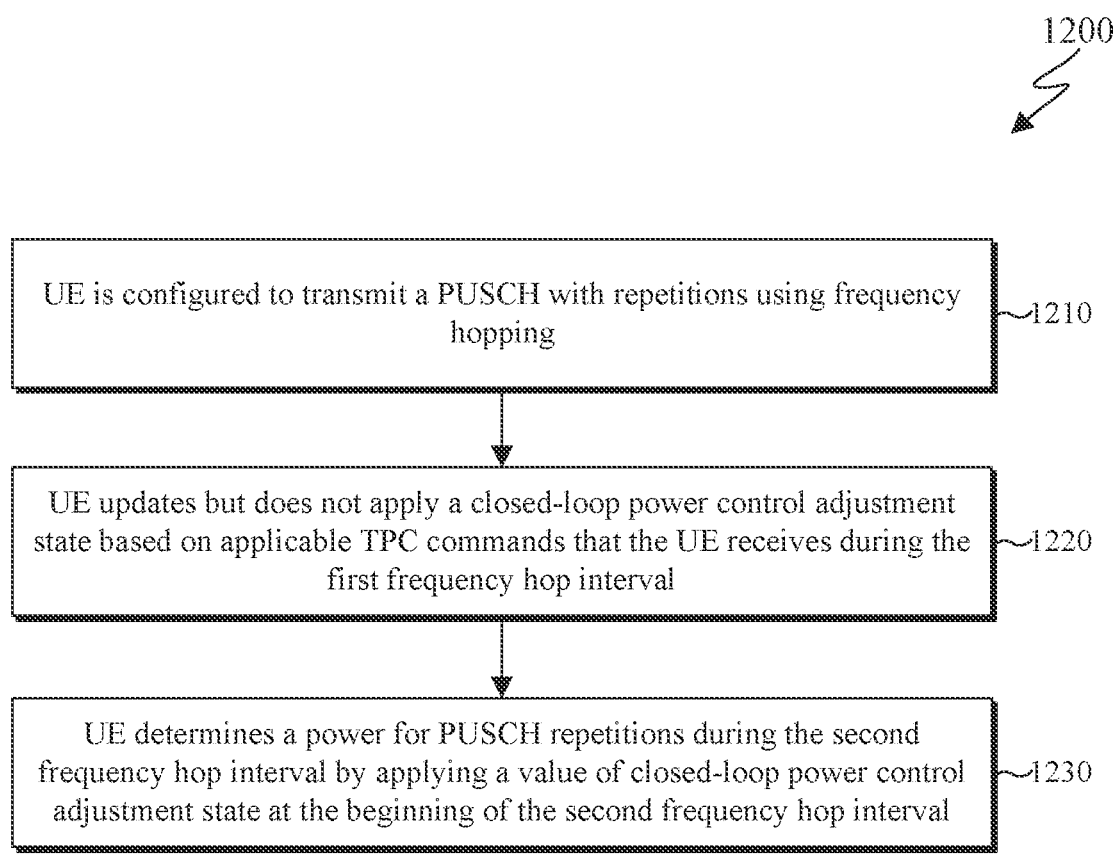
FIG. 12 illustrates an example method for transmitting a PUSCH with repetitions using frequency hopping to determine a power for the repetitions in different frequency hopping intervals according to embodiments of the present disclosure.

FIG. 7 illustrates an example method 700 for determining a transmission power of PUSCH repetitions in a time window according to embodiments of the present disclosure. FIG. 8 illustrates an example method 800 for calculating a transmit power during a second time window using TPC commands received during a first time window according to embodiments of the present disclosure. FIG. 9-11 illustrates example methods 900, 1000, and 1100, respectively, for determining a power of a PUSCH transmission during a time window according to embodiments of the present disclosure. FIG. 12 illustrates an example method 1200 for transmitting a PUSCH with repetitions using frequency hopping to determine a power for the repetitions in different frequency hopping intervals according to embodiments of the present disclosure.

The steps of the method 700 of FIG. 7, method 800 of FIG. 8, method 900 of FIG. 9, method 1000 of FIG. 10, method 1100 of FIG. 11, and method 1200 of FIG. 12 can be performed by any of the UEs 111-116 of FIG. 1, such as the UE 116 of FIG. 3. The methods 700-1200 are for illustration only and other embodiments can be used without departing from the scope of the present disclosure.

A time window can be defined as a time interval where a UE (such as the UE 116) transmits repetitions of a PUSCH or PUCCH with a same transmit power. During the time window the UE skip an application of TPC commands and does not update a closed-loop power control adjustment state. During the time window, the UE accumulates TPC commands, updates a corresponding closed-loop power control adjustment state and applies a latest updated value to determine a power for repetitions of the PUSCH or PUCCH transmission when the time window changes. For example, a UE transmits repetitions of a PUSCH with a same transmit power during a time window and transmits repetitions of the PUSCH with a different power after the time window changes, wherein the different power is calculated by applying the closed-loop power control adjustment state that is updated using TPC commands accumulated during the previous time window. If a last slot or symbol of a first time window and a first slot or symbol of a second time window are not consecutive slots or symbols, and a one or more TPC commands are received after the end of the first time window and the start of the second time window, the closed-loop power control adjustment state used to calculate the transmit power of PUSCH or PUCCH repetitions transmitted in the second time window can also accumulate the one or more TPC commands received after the end of the first time window and the start of the second time window. Thus, the accumulation of TPC commands used to calculate the transmit power of the PUSCH transmission in the PUSCH transmission occasion i may include TPC commands received up to the immediately preceding PUSCH transmission occasion i−1 or up to an earlier PUSCH transmission occasion. The one or more TPC commands received after the end of the first time window and the start of the second time window can be TPC commands received in a DCI format 2_2 with CRC scrambled by TPC-PUSCH-radio network temporary identifier (RNTI). When a gNB (such as the BS 102) schedules a UE with PUSCH transmission with a number of type A repetitions $N_{rep}$ and the time window over which the UE does not apply an update to a closed-loop power control adjustment state and transmits PUSCH repetitions with a same power has a duration of $N_w$ slots, the number of repetitions can be, for example, twice the number of slots in a time window, $N_{rep}=2 \cdot N_w$. A first slot of the time window is the slot where the UE transmits a first PUSCH repetition and the consecutive $N_{rep}-1$ slots are available for PUSCH transmission. The first $N_w$ PUSCH repetitions in the first $N_w$ slots are transmitted with power $P_1$ and the second $N_w$ PUSCH repetitions are transmitted with a different power $P_2$. For such operating conditions, determining a time window of $N_w$ slots over which a UE can transmit PUSCH symbols with a same power can enable a gNB to perform joint channel estimation by filtering a DM-RS over $N_w$ slots and coherently demodulate PUSCH symbols over the $N_w$ slots.

The method 700 of FIG. 7 describes an example procedure for determining a transmission power of PUSCH repetitions in a time window according to embodiments of this disclosure.

In step 710, a UE (such as the UE 116) is configured a time window over a number of slots or over a number of repetitions, wherein the time window has length of $N_w$ slots or of $N_w$ repetitions. In step 720, the UE is scheduled by a DCI format to transmit the PUSCH and is provided a number of repetitions $N_{rep}$, wherein $N_{rep} > N_w$. In step 730, the UE transmits the PUSCH repetitions with a first power $P_1$ over the first $N_w$ slots or over the first $N_w$ repetitions and with a second power $P_2$ over the next slots or repetitions.

The method 800 of FIG. 8 describes an example procedure for a UE to calculate a transmit power during a second time window using TPC commands received during a first time window according to embodiments of this disclosure.

In step 810, a UE (such as the UE 116) is configured a time window over a number of slots or over a number of repetitions. In step 820, the UE transmits PUSCH repetitions with a same first power during a first time window, wherein the UE accumulates TPC commands to update a closed-loop power control adjustment state during a first number of repetitions. In step 830, the UE calculates a second transmit power for repetitions during a second time window using the closed-loop power control adjustment state at the beginning of the second time window. In step 840, the UE transmits PUSCH repetitions with the second transmit power during the second time window.

It is noted that in step 830, the power control adjustment state at the beginning of the second time window can be based on the power control adjustment state at the end of the first time window, or can be based on the power control adjustment state at the end of the first time window and on power control commands received after the last symbol of the first time window and the first symbol of the second time window, if any.

In certain embodiments, when a UE (such as the UE 116) is configured with DM-RS bundling, during a time window for DM-RS bundling the UE accumulates TPC commands received in a DCI format 2_2 with CRC scrambled by TPC-PUSCH-RNTI. The UE also updates a corresponding closed-loop power control adjustment state and applies a latest updated value to determine a power for repetitions of the PUSCH or PUCCH transmission when the time window changes. The UE applies accumulated TPC command values for the first repetition (first transmission occasion) in each time window. Repetitions after the first repetition within a time window can be transmitted with same or different power of the first repetition.

For example, if the UE receives a TPC command value in a DCI format that schedules the PUSCH transmission occasion i during the time window, the UE updates the corresponding closed-loop power control adjustment state and applies the updated value to determine the power for the transmission of the PUSCH repetition in the PUSCH transmission occasion i. For each of the subsequent PUSCH transmission occasions after PUSCH transmission occasion i within the time window, the UE updates the corresponding closed-loop power control adjustment state based on the received TPC command, if any. Here the TPC command can be received in a DCI format 2_2 with CRC scrambled by TPC-PUSCH-RNTI or in a DCI format that schedules the PUSCH transmission occasion. The UE can apply the updated value to determine the power for the transmission of the PUSCH repetition in the PUSCH transmission occasion. The UE applies TPC command values, received in a DCI format scheduling a PUSCH transmission or in a DCI format 2_2 with CRC scrambled by TPC-PUSCH-RNTI, between successive transmission occasions for repetitions within the time window, instead of applying accumulated TPC command values only for the first repetition (first transmission occasion) in each time window and then maintaining a same power for transmission of repetitions within the time window while accumulating TPC command values received within the time window to apply for determining the power of the first repetition in the next time window.

The method 900 of FIG. 9 describes an example procedure for a UE to determine a power of a PUSCH transmission during a time window according to embodiments of this disclosure.

In step 910, a UE (such as the UE 116) is configured for operation with DM-RS bundling in a time window over a number of slots. In step 920, the UE accumulates TPC commands received in a DCI format 2_2 with CRC scrambled by TPC-PUSCH-RNTI and updates a corresponding closed-loop power control adjustment state. In step 930, the UE transmits a number of PUSCH repetitions during the time window with a same first power. In step 940, the UE receives a TPC command value in a DCI format that schedules the PUSCH transmission occasion i during the time window. In step 950, the UE updates the corresponding closed-loop power control adjustment state. The UE, in step 950, also applies the updated value to determine a second power for the transmission of the PUSCH repetition in the PUSCH transmission occasion i. In step 960, the UE transmits the PUSCH repetition in the PUSCH transmission occasion i during the time window with the second power. In step 970 the UE updates the corresponding closed-loop power control adjustment state based on a received TPC command, if any. Here, the TPC command is received in a DCI format 2_2 with CRC scrambled by TPC-PUSCH-RNTI, in a DCI format that schedules the PUSCH transmission occasion, or a combination thereof. Additionally, in step 970, the UE applies the updated value to determine a third power for the transmission of the PUSCH repetition in the PUSCH transmission occasion i+1. In step 980, the UE transmits the PUSCH repetition in the PUSCH transmission occasion i+1 during the time window with the third power.

For another example, if the UE receives a TPC command value in a DCI format that schedules the PUSCH transmission occasion i during the time window, the UE updates the corresponding closed-loop power control adjustment state and applies the updated value to determine the power for the transmission of the PUSCH repetition in the PUSCH transmission occasion i. For a subsequent PUSCH transmission occasion i+1 after PUSCH transmission occasion i within the time window, the UE updates the corresponding closed-loop power control adjustment state based on the received TPC command, if any. Here the TPC command can be received in a DCI format 2_2 with CRC scrambled by TPC-PUSCH-RNTI or in a DCI format that schedules the PUSCH transmission occasion i+1. The UE can apply the updated value to determine the power for the transmission of the PUSCH repetition in the PUSCH transmission occasion i+1 only if the TPC command is received in a DCI format that schedules the PUSCH transmission occasion i+1. If the TPC command is received in a DCI format 2_2 with CRC scrambled by TPC-PUSCH-RNTI, the UE uses the same transmit power of the preceding PUSCH transmission to transmit the PUSCH transmission in the PUSCH transmission i+1 and applies the closed-loop power adjustment state corresponding to accumulated TPC commands after transmission occasion i in the time window for determining a transmission power for a first repetition in the next time window.

The method 1000 of FIG. 10 describes an example procedure for a UE to determine a power of a PUSCH transmission during a time window according to embodiments of this disclosure.

In step 1010, a UE (such as the UE 116) is configured for operation with DM-RS bundling in a time window over a number of slots. In step 1020, the UE accumulates TPC commands received in a DCI format 2_2 with CRC scrambled by TPC-PUSCH-RNTI. Additionally, in step 1020, the UE updates a corresponding closed-loop power control adjustment state. In step 1030, the UE transmits a number of PUSCH repetitions during the time window with a same first power. In step 1040, the UE receives a TPC command value in a DCI format that schedules the PUSCH transmission occasion i during the time window. In step 1050, the UE updates the corresponding closed-loop power control adjustment state and applies the updated value to determine a second power for the transmission of the PUSCH repetition in the PUSCH transmission occasion i. In step 1060, the UE transmits the PUSCH repetition in the PUSCH transmission occasion i during the time window with the second power. In step 1070, the UE receives a TPC command value in a DCI format 2_2 with CRC scrambled by TPC-PUSCH-RNTI. In step 1080, the UE updates the corresponding closed-loop power control adjustment state. In step 1090, the UE transmits the PUSCH repetition in the PUSCH transmission occasion i+1 during the time window with the second power.

The method 1100 of FIG. 11 describes an example procedure for a UE to determine a power of a PUSCH transmission during a time window according to embodiments of this disclosure.

In step 1110 a UE (such as the UE 116) is configured for operation with DM-RS bundling in a time window over a number of slots. In step 1120, the UE receives a TPC command and updates the corresponding closed-loop power control adjustment state. In step 1130, the UE determines whether the TPC command is received in a DCI format 2_2 with CRC scrambled by TPC-PUSCH-RNTI or in a DCI format that schedules the PUSCH transmission. When the TPC command is received in a DCI format 2_2 with CRC scrambled by TPC-PUSCH-RNTI (as determined in step 1130), the UE in step 1140 transmits the PUSCH repetition with a same first power of a preceding repetition. Otherwise, the UE in step 1140 determines a second power for the transmission of the PUSCH repetition.

For yet another example, if the UE receives a TPC command value in a DCI format that schedules the PUSCH transmission occasion i during the time window, the UE updates the corresponding closed-loop power control adjustment state and does not apply the updated value to determine the power for the transmission of the PUSCH repetition in the PUSCH transmission occasion i. For each of the subsequent PUSCH transmission after PUSCH transmission occasion i within the time window, the UE updates the corresponding closed-loop power control adjustment state based on the received TPC command, if any, wherein the TPC command can be received in a DCI format 2_2 with CRC scrambled by TPC-PUSCH-RNTI or in a DCI format that schedules the PUSCH transmission, and does not apply the updated value to determine the power for the transmission of the PUSCH repetition in the PUSCH transmission occasion. The transmission power of the PUSCH repetitions in any of the PUSCH transmission occasions within the time window is same. The UE applies the closed-loop power control adjustment state for determining a power for a first repetitions of the PUSCH transmission in the next time window.

When a PUSCH transmission with repetitions is dynamically scheduled by an UL grant in a DCI format, a power of PUSCH transmissions in a first time window is calculated based on a first TPC command received in the DCI format and/or is calculated based on a closed-loop power control adjustment state updated with the first TPC command. The UE accumulates TPC commands received in a DCI format 2_2 during the first time window, if any, by updating a corresponding closed-loop power control adjustment state and applies the latest updated value to determine a power for repetitions transmitted after the first time window. If a second TPC command is received in a DCI format 2_2 after the start of the first time window and the first PUSCH transmission in the first time window starts after the reception of the second TPC command, the closed-loop power control adjustment state is updated based on the received second TPC command and is applied to calculate the power of PUSCH transmissions during the first time window. Alternatively, the closed-loop power control adjustment state is updated based on the received second TPC command but it is not applied to calculate the power of PUSCH transmissions during the first time window.

When a PUSCH transmission with repetitions corresponds to a configured grant Type 1 PUSCH transmission that is semi-statically configured to operate upon the reception of a higher layer parameter, or to a configured grant Type 2 PUSCH transmission that is semi-persistently scheduled by an UL grant in a valid activation DCI, a power of PUSCH transmissions in a first time window is calculated based on a closed-loop power control adjustment state that accumulates TPC commands received before the start of the first time window, wherein a last TPC command that is accumulated can be received before the start of the time window, or is received after the start of the time window but before the start of the first PUSCH transmission within the time window. If a first TPC command is received in a DCI format 2_2 at the start of the first time window and the first PUSCH transmission in the first time window starts after the reception of the first TPC command, the closed-loop power control adjustment state can be updated based on the received first TPC command. The updated closed-loop power control adjustment state is applied to calculate the power of PUSCH transmissions during the first time window. The UE accumulates TPC commands received during the first time window, if any, by updating a corresponding closed-loop power control adjustment state and applies the latest updated value to determine a power for repetitions transmitted after the first time window, wherein the last accumulated TPC command is received in a PUSCH transmission occasion immediately preceding the PUSCH transmission occasion of the first transmission after the window, or is received in an earlier PUSCH transmission occasion.

It is noted that although some of the descriptions considered a PUSCH transmission with repetitions in time windows, a same or similar UE procedure can apply for a PUCCH transmission with repetitions in time windows, wherein the PUCCH transmission with repetitions can be scheduled by a DCI format or can be semi-statically configured, and the PUSCH transmission with repetitions can be dynamically scheduled by an UL grant in a DCI, or the transmission can correspond to a configured grant Type 1 or Type 2. The configured grant Type 1 PUSCH transmission is semi-statically configured to operate upon the reception of higher layer parameter of configuredGrantConfig including rrc-ConfiguredUplinkGrant without the detection of an UL grant in a DCI. The configured grant Type 2 PUSCH transmission is semi-persistently scheduled by an UL grant in a valid activation DCI after the reception of higher layer parameter configuredGrantConfig not including rrc-ConfiguredUplinkGrant. The PUSCH transmission corresponding to a Type 1 configured grant or a Type 2 configured grant can be activated by DCI format 0_0 or 0_1. The PUSCH transmission corresponding to a Type 2 configured grant can be activated by DCI format 0_2. The PUSCH transmissions can be PUSCH transmissions of PUSCH repetition Type A scheduled by DCI format 0_1 or 0_2, PUSCH repetition Type A with a configured grant, PUSCH repetition Type B and TB processing over multiple slots. The PUCCH transmissions can be PUCCH transmissions of PUCCH repetition Type A or PUCCH repetition Type B.

In certain embodiments, a UE (such as the UE 116) is configured for frequency hopping of a PUSCH transmission by a higher layer parameter or by a DCI format, if any, scheduling the PUSCH transmission by a UE. When a time window is not separately indicated, the time window can be defined by a time duration of a transmission in a frequency hop. When the UE transmits in different frequency hops the UE can transmit PUSCH with a first power during a first frequency hop interval, and transmit PUSCH with a second power, different from the first power, in a second frequency hop interval. For transmissions within the first frequency hop interval, the UE updates but does not apply a closed-loop power control adjustment state based on applicable TPC commands that the UE receives during the first frequency hop interval. The UE determines a power for the PUSCH repetitions during the second frequency hop interval by applying a value of the closed-loop power control adjustment state at the beginning for the second frequency hop interval.

The method 1200 of FIG. 12 describes an example procedure for a UE that transmits a PUSCH with repetitions using frequency hopping to determine a power for the repetitions in different frequency hopping intervals according to embodiments of this disclosure.

In step 1210, a UE (such as the UE 116) is configured to transmit a PUSCH with repetitions using frequency hopping. In step 1220, the UE updates but does not apply a closed-loop power control adjustment state based on applicable TPC commands that the UE receives during the first frequency hop interval. In step 1230, the UE determines a power for the PUSCH repetitions during the second frequency hop interval by applying a value of the closed-loop power control adjustment state at the beginning of the second frequency hop interval.

In certain embodiments, when a UE (such as the UE 116) is configured to transmit a PUSCH with repetitions using frequency hopping, a time window over which the UE updates but does not apply a closed-loop power control adjustment state based on applicable TPC commands, and transmits with a constant power can be defined by the time period where the UE transmits in a single hop. Additionally, a gNB can configure a time window, wherein the time window can be smaller than or equal to the duration of a frequency hop interval. A UE can transmit repetitions using different powers in different configured time windows within a frequency hop interval. In case a configured time window for transmission of repetitions with a constant power includes more than one frequency hop, a UE transmits with a first power over the part of the time window within the first frequency hop interval, and transmits with a second power over the part of the time window within the second frequency hop interval.

Although FIG. 7 illustrates the method 700, FIG. 8 illustrates the method 800, FIG. 9 illustrates the method 900, FIG. 10 illustrates the method 1000, FIG. 11 illustrates the method 1100, and FIG. 12 illustrates the method 1200 various changes may be made to FIGS. 7-12. For example, while the methods 700-1200 are shown as a series of steps, various steps could overlap, occur in parallel, occur in a different order, or occur multiple times. In another example, steps may be omitted or replaced by other steps. For example, steps of the methods 700-1200 can be executed in a different order.

Embodiments of the present disclosure describe a determination of RVs for encoding of a TB in repetitions of a PUSCH transmission. This is described in the following examples and embodiments, such as those of FIGS. 13-18.

Figure 13:
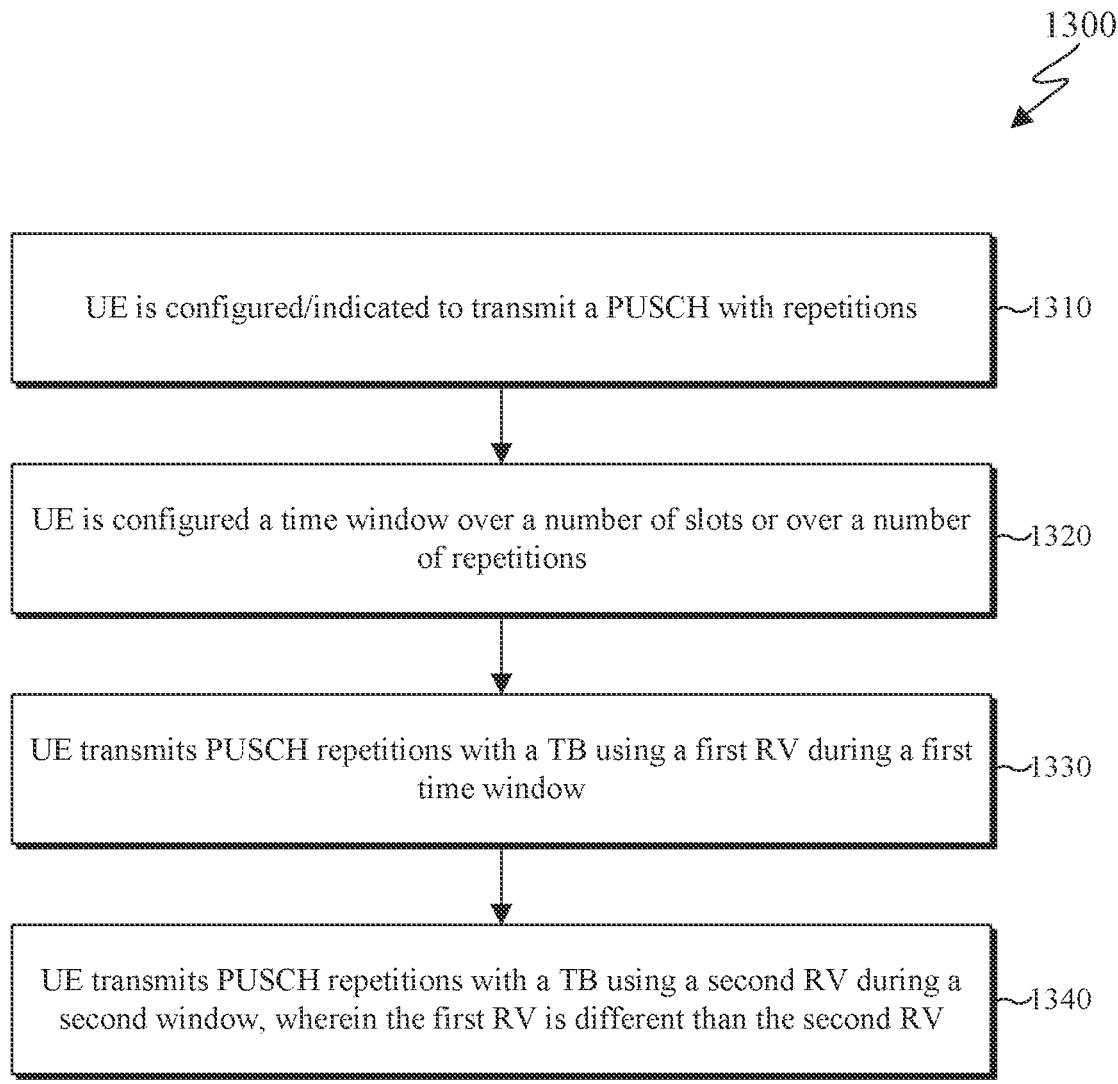
FIG. 13 illustrates an example method for determining redundancy versions (RVs) to encode a transport block (TB) in respective repetitions of a PUSCH transmission according to embodiments of the present disclosure.
Figure 14:
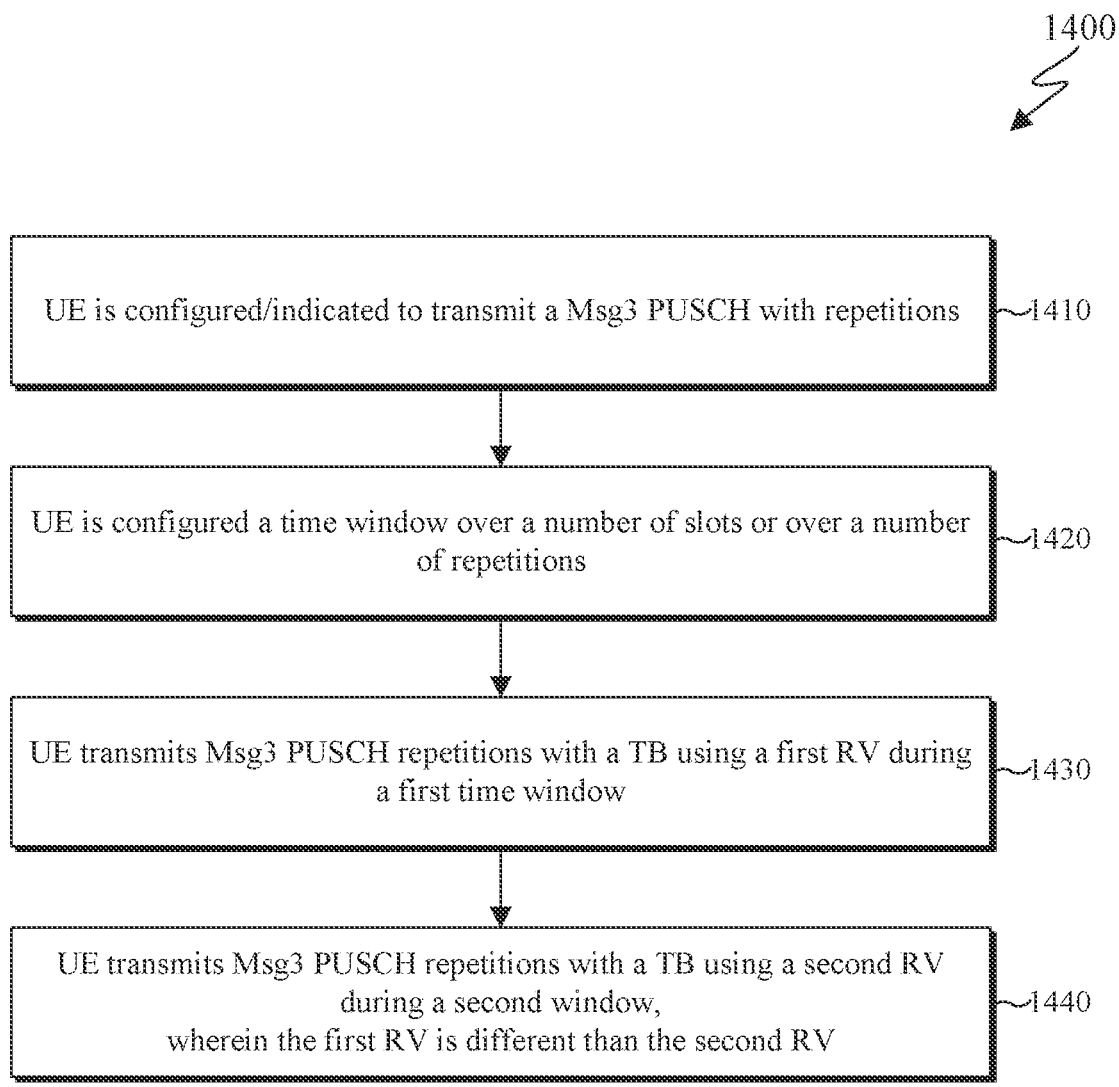
FIG. 14 illustrates an example method for determining RVs to encode a TB in respective repetitions of a Msg2 PUSCH transmission according to embodiments of the present disclosure.
Figure 15:
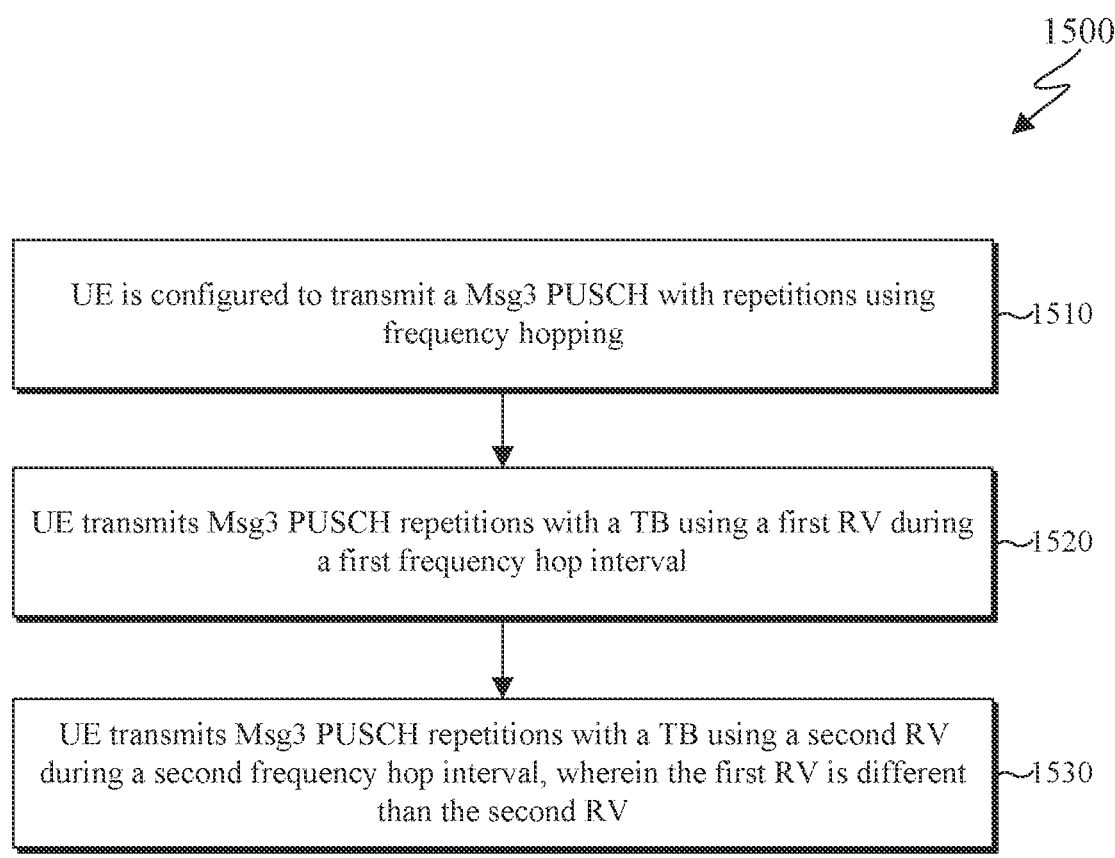
FIG. 15 illustrates an example method for transmitting a Msg3 PUSH with repetitions using frequency hopping to determine RVs to encode a TB in respective repetitions of a Msg3 PUSCH transmission according to embodiments of the present disclosure.
Figure 16:
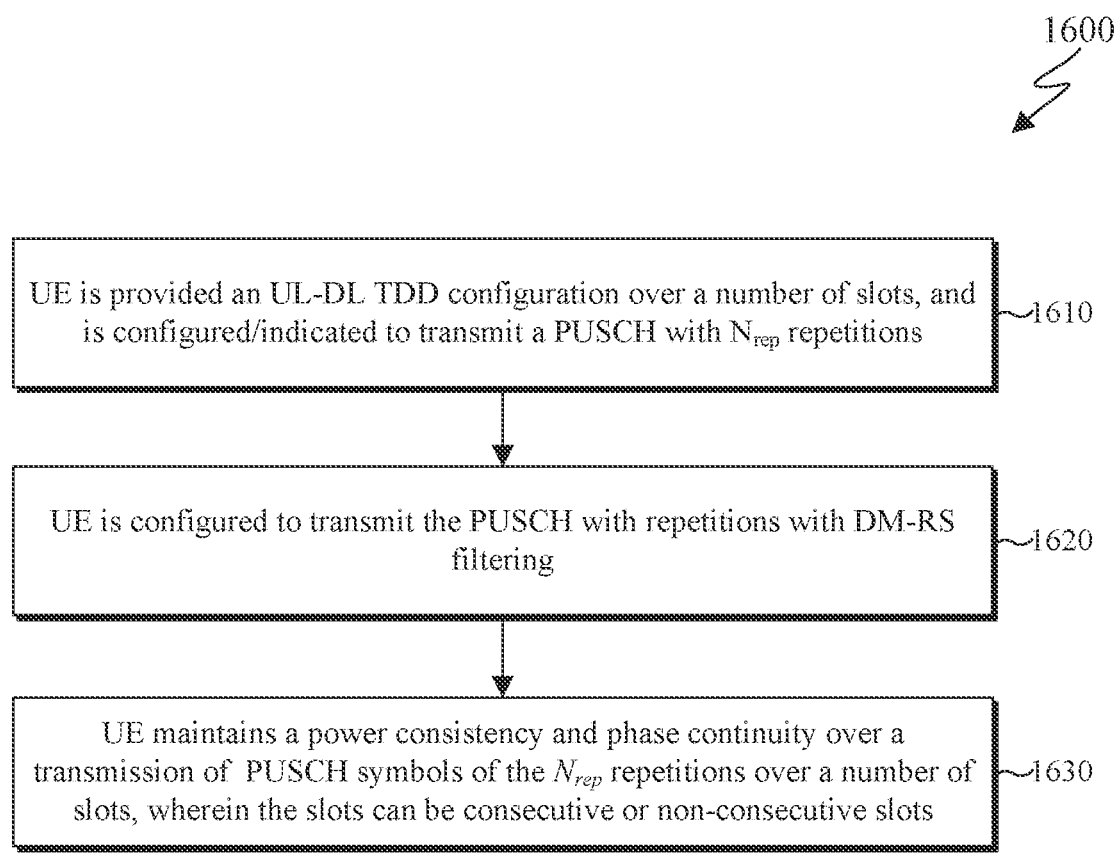
FIG. 16 illustrates an example method for determining a power and phase for repetitions of a PUSCH or a physical uplink control channel (PUCCH) transmission when the UE is configured for transmission with demodulation reference signal (DM-RS) filtering according to embodiments of the present disclosure.
Figure 17:
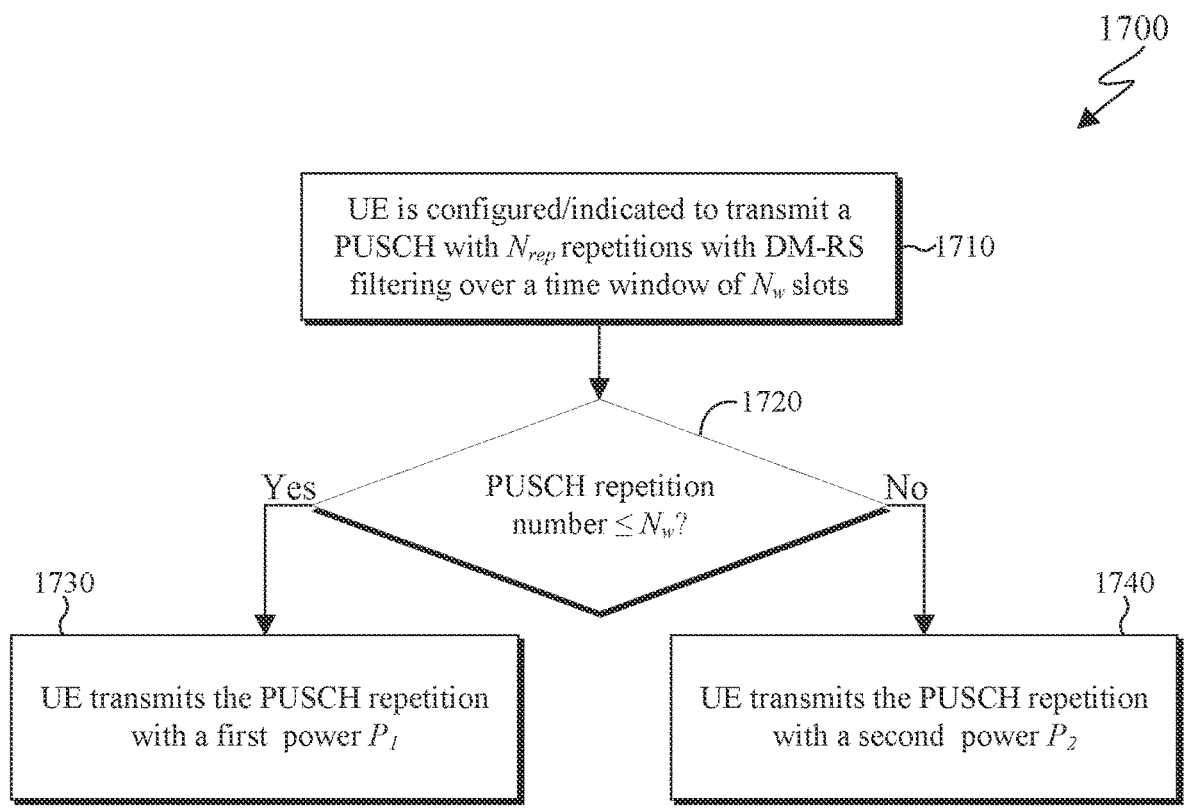
FIG. 17 illustrates an example method for determining a power and phase for repetitions of a PUSCH or a PUCCH transmission when the UE is configured for transmission with DM-RS filtering over a time window according to embodiments of the present disclosure.
Figure 18:
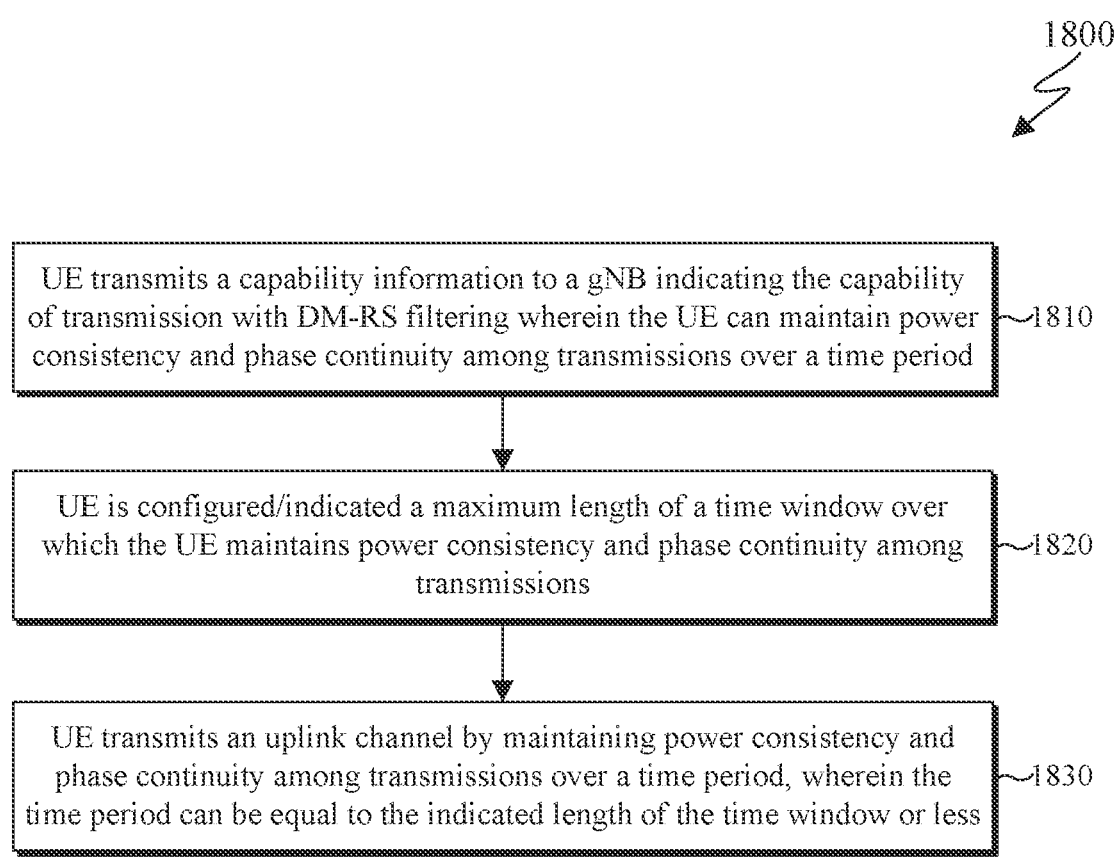
FIG. 18 illustrates an example method for determining a length of a time window according to embodiments of the present disclosure.

FIG. 13 illustrates an example method 1300 for determining RVs to encode a TB in respective repetitions of a PUSCH transmission according to embodiments of the present disclosure. FIG. 14 illustrates an example method 1400 for determining RVs to encode a TB in respective repetitions of a Msg2 PUSCH transmission according to embodiments of the present disclosure. FIG. 15 illustrates an example method 1500 for transmitting a Msg3 PUSH with repetitions using frequency hopping to determine RVs to encode a TB in respective repetitions of a Msg3 PUSCH transmission according to embodiments of the present disclosure. FIG. 16 illustrates an example method 1600 for determining a power and phase for repetitions of a PUSCH or a PUCCH transmission when the UE is configured for transmission with DM-RS filtering according to embodiments of the present disclosure. FIG. 17 illustrates an example method 1700 for determining a power and phase for repetitions of a PUSCH or a PUCCH transmission when the UE is configured for transmission with DM-RS filtering over a time window according to embodiments of the present disclosure. FIG. 18 illustrates an example method 1800 for determining a length of a time window according to embodiments of the present disclosure.

The steps of the method 1300 of FIG. 13, method 1400 of FIG. 14, method 1500 of FIG. 15, method 1600 of FIG. 16, method 1700 of FIG. 17, and method 1800 of FIG. 18 can be performed by any of the UEs 111-116 of FIG. 1, such as the UE 116 of FIG. 3. The methods 1300-1800 are for illustration only and other embodiments can be used without departing from the scope of the present disclosure.

In certain embodiments, a time window is defined as a time interval where a UE transmits with a same RV. For example, in addition to maintaining a same transmission power and a same precoding, the UE maintains a same RV for encoding of TBs provided in repetitions of a PUSCH transmission over the time window. The UE can apply a same RV to encode a TB provided in repetitions of a PUSCH transmission within a first time window and apply different RV to encode a TB provided in repetitions of a PUSCH transmission within a first time window. Using a same RV within a time window is advantageous as it can enable symbol-level combining, instead of log-likelihood ratio (LLR) combining, for the repetitions thereby improving a reception reliability for the TB decoding. For repetitions in another time window, a different RV can be used for the TB encoding in order to also obtain gains from applying incremental redundancy. Therefore, using a RV cycling unit of a time window is preferable for an overall reception reliability over using a RV cycling unit of a single repetition.

In certain embodiments, a UE (such as the UE 116) can use a predefined RV sequence for transmissions in different time windows with different RVs. For example, {0,2,3,1}, {2,3,1,0}, {3,1,0,2}, {1,0,2,3}, {0,3,0,3} are RV sequences that a UE can use to transmit over sequential time windows. Sequential time windows can use different RVs, or a RV cycling unit can be a number of consecutive time windows, for example 2 time windows. It is also possible that one sequence is a default configuration, for example the sequence {0,2,3,1}, and additionally a gNB can configure a different RV sequence. The non-default RV sequence can be provided in a SIB or by UE-specific higher layer signalling. The configuration of an RV sequence can also be part of the configuration of a time window if present. It is also possible that an RV sequence is associated with a FH configuration.

The method 1300 of FIG. 13 describes an example procedure for a UE to determine RVs to encode a TB in respective repetitions of a PUSCH transmission according to embodiments of this disclosure.

In step 1310, a UE (such as the UE 116) is configured/indicated to transmit a PUSCH with repetitions. In step 1320, the UE is configured a time window over a number of slots or over a number of repetitions. In step 1330, the UE transmits PUSCH repetitions with a TB using a first RV during a first time window. In step 1340, the UE transmits PUSCH repetitions with a TB using a second RV during a second window, wherein the first RV is different than the second RV.

In certain embodiments, a time window is defined to be same as a frequency hop interval. When a UE transmits in different frequency hops, the UE can use a first RV to encode a TB in PUSCH repetitions within a first frequency hop and use a second RV to encode the TB in PUSCH repetitions within a second frequency hop. The first and second RVs can be obtained by cycling over RV values of a predefined or signaled/configured RV sequence.

It is noted that the embodiments described for PUSCH transmission with repetitions apply to any type of PUSCH repetitions, for example type A or type B repetitions, and also apply to PUCCH transmission with repetitions (with respect to maintaining a same transmission power within a time window for DM-RS filtering or using a same precoding or spatial filter for the repetitions within the window).

It is also noted that the embodiments described for PUSCH transmission with repetitions also apply when a gNB schedules a UE with PUSCH transmission of a single TB over multiple slots, and also apply when a gNB schedules a UE with PUSCH transmission of a single TB over multiple slots and a number of repetitions of the scheduled TB over the multiple slots.

It is further noted that the embodiments described for PUSCH transmission with repetitions also apply to Msg3 PUSCH transmission with repetitions with respect to maintaining a same RV for encoding of TBs provided in repetitions of a Msg3 PUSCH transmission or using a same precoding or spatial filter for the repetitions within the time window.

The method 1400 of FIG. 14 describe an example procedure for a UE to determine RVs to encode a TB in respective repetitions of a Msg3 PUSCH transmission according to embodiments of this disclosure.

In step 1410, a UE (such as the UE 116) is configured/indicated to transmit a Msg3 PUSCH with repetitions. In step 1420, the UE is configured a time window over a number of slots or over a number of repetitions. In step

1430, the UE transmits Msg3 PUSCH repetitions with a TB using a first RV during a first time window. In step 1440, the UE transmits Msg3 PUSCH repetitions with a TB using a second RV during a second time window, wherein the first RV is different than the second RV.

In certain embodiments, a time window is defined to be same as a frequency hop interval. When a UE transmits in different frequency hops, the UE can use a first RV to encode a TB in Msg3 PUSCH repetitions within a first frequency hop and use a second RV to encode the TB in Msg3 PUSCH repetitions within a second frequency hop. The first and second RVs can be obtained by cycling over RV values of a predefined or signaled/configured RV sequence.

The method 1500 of FIG. 15 describes an example procedure for a UE that transmits a Msg3 PUSCH with repetitions using frequency hopping to determine RVs to encode a TB in respective repetitions of a Msg3 PUSCH transmission according to embodiments of this disclosure.

In step 1510, a UE (such as the UE 116) is configured to transmit a Msg3 PUSCH with repetitions using frequency hopping. In step 1520, the UE transmits Msg3 PUSCH repetitions with a TB using a first RV during a first frequency hop interval. In step 1530, the UE transmits Msg3 PUSCH repetitions with a TB using a second RV during a second frequency hop interval, wherein the first RV is different than the second RV.

In certain embodiments, when a gNB (such as the BS 102) configures a UE (such as the UE 116) for transmission of PUSCH or PUCCH with repetitions and with DM-RS filtering (wherein transmission with DM-RS filtering refers to the UE maintaining power consistency and phase continuity among transmissions over the slots where repetitions are transmitted), the time window for DM-RS filtering can comprise consecutive or non-consecutive slots depending on whether repetitions are transmitted in consecutive or non-consecutive slots.

In certain embodiments, when a gNB (such as the BS 102) indicates a number of slots $N_w$ as a length of a time window and configures/indicates transmission of PUSCH or PUCCH with $N_{REP}$ repetitions, a UE (such as the UE 116) transmits PUSCH or PUCCH repetitions by maintaining power consistency and phase continuity over the $N_w$ slots. Depending on a configuration and/or an indication by a gNB, the UE can transmit repetitions in consecutive or non-consecutive slots. It is possible that the UE completes the transmission of the $N_{REP}$ repetitions in a number of slots smaller than $N_w$ slots, and the actual length of the time window is equal to a number of slots smaller than the indicated number $N_w$. It is also possible that the UE does not complete the transmission of the $N_{REP}$ repetitions in $N_w$ slots. In this case the UE maintains power consistency and phase continuity among PUSCH or PUCCH repetitions within the first $N_w$ slots. The remaining repetitions are transmitted without a constraint in power consistency and phase continuity, or power consistency and phase continuity is maintained within a next set of slots which comprises up to $N_w$ slots. The number of slots $N_w$ is a maximum length of the time window over which a UE can maintain power consistency and phase continuity.

A maximum length of a time window can be indicated in a DCI format and can provide a number of slots or a number of symbols or a number of repetitions. It is also possible that a maximum length of a time window is configured by higher layers. The start of the time window can be the slot where the first repetition is transmitted or the first symbol of the first repetition or the first repetition depending on whether the length of the time window is provided as a number of slots or symbols or repetitions, respectively. It is also possible that the length of the time window over which the UE can maintain power consistency and phase continuity is configured by a gNB to be the same as the number of PUSCH or PUCCH repetitions when the UE is configured/indicated to transmit with repetitions, and no additional information regarding the time window is provided to the UE. The UE can be configured with either repetition type A or type B, and consecutive repetitions can be transmitted in consecutive symbols wherein the last symbol of a repetition and the first symbol of the next repetition are adjacent symbols (back-to-back transmission) or are not adjacent symbols (non-back-to-back transmission).

In certain embodiments, when a UE (such as the UE 116) is configured for transmission with a TB over multiple slots and is configured for transmission with DM-RS filtering, the maximum length of the time window is provided as a number of slots and the start of the time window is the slot where the first part of the TB is transmitted. It is also possible that no additional indication of the time window is provided, and a UE configured with DM-RS filtering applies power consistency and phase continuity over the slots where the TB is transmitted.

The method 1600 of FIG. 16 describes an example procedure for a UE to determine a power and phase for repetitions of a PUSCH or a PUCCH transmission when the UE is configured for transmission with DM-RS filtering, according to embodiments of this disclosure.

In step 1610 a UE (such as the UE 116) UE is provided an UL-DL TDD configuration over a number of slots and is configured/indicated to transmit a PUSCH with $N_{REP}$ repetitions. In step 1620, the UE is configured to transmit the PUSCH with repetitions with DM-RS filtering. In step 1630, the UE maintains a power consistency and phase continuity over a transmission of PUSCH symbols of the $N_{REP}$ repetitions over a number of slots, wherein the slots can be consecutive or non-consecutive slots.

The method 1700 of FIG. 17 describes an example procedure for a UE to determine a power and phase for repetitions of a PUSCH or a PUCCH transmission when the UE is configured for transmission with DM-RS filtering over a time window of maximum length equal to $N_w$ slots, according to embodiments of this disclosure.

In step 1710, a UE (such as the UE 116) is configured/indicated to transmit a PUSCH with $N_{REP}$ repetitions with DM-RS filtering over a time window of $N_w$ slots. In step 1720, the determines whether the PUSCH repetition is within a first time window or in a second time window. When the PUSCH repetition is within a first time window (as determined in step 1720), the UE in step 730 transmits the PUSCH repetition with a first power $P_1$. Alternatively, when the PUSCH repetition is within a second time window (as determined in step 1720), the UE in step 1740 transmits the PUSCH repetition with a second power $P_2$.

In certain embodiments, a UE (such as the UE 116) transmits a capability information to a gNB (such as the BS 102) indicating the capability of the UE to transmit with DM-RS filtering wherein the UE can maintain power consistency and phase continuity among transmissions over a time period. The UE capability information can be a number of slots, a number of symbols or a number of repetitions. It is also possible that the UE capability information is whether the UE supports maintaining power consistency and phase continuity among transmissions or not. Based on the signaling informing about the length of a time period over which the UE can maintain power consistency and phase continuity among transmissions or about the support of such feature, the gNB determines the maximum length of the time window for joint channel estimation and configures the UE with a maximum length of the time window.

The method 1800 of FIG. 18 describes an example procedure for a UE to determine a length of a time window according to embodiments of this disclosure.

In step 1810, a UE (such as the UE 116) transmits a capability information to a gNB indicating the capability of transmission with DM-RS filtering wherein the UE can maintain power consistency and phase continuity among transmissions over a time period. In step 1820, the UE is configured/indicated a maximum length of a time window over which the UE maintains power consistency and phase continuity among transmissions. In step 1830, the UE transmits an uplink channel by maintaining power consistency and phase continuity among transmissions over a time period, wherein the time period can be equal to the indicated length of the time window or less.

Although FIG. 13 illustrates the method 1300, FIG. 14 illustrates the method 1400, FIG. 15 illustrates the method 1500, FIG. 16 illustrates the method 1600, FIG. 17 illustrates the method 1700, and FIG. 18 illustrates the method 1800 various changes may be made to FIGS. 13-18. For example, while the methods 1300-1800 are shown as a series of steps, various steps could overlap, occur in parallel, occur in a different order, or occur multiple times. In another example, steps may be omitted or replaced by other steps. For example, steps of the methods 1300-1800 can be executed in a different order.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE), comprising:
a transceiver configured to transmit an uplink channel with repetitions based on a first power within a first time domain window, wherein the first power is determined based on a first power control adjustment state; and
a processor operably coupled to the transceiver, the processor configured to determine:
a first value by accumulating transmit power control (TPC) commands received within the first time domain window,
a second power control adjustment state based on the first power control adjustment state and the first value, and
a second power based on the second power control adjustment state,
wherein the transceiver is further configured to transmit the uplink channel with repetitions based on the second power within a second time domain window.

2. The UE of claim 1, wherein:
the transceiver is further configured to receive one or more TPC commands after an end of the first time domain window and a start of the second time domain window,
the processor is further configured to obtain a second value by accumulating the one or more TPC commands, and
the second power control adjustment state is determined based on the second value.

3. The UE of claim 1, wherein:
the TPC commands are provided by a downlink control information (DCI) format that does not schedule the uplink channel, and
a TPC command associated with the first power control adjustment state is provided by a DCI format that schedules the uplink channel.

4. The UE of claim 1, wherein:
the transceiver is further configured to receive a message for configuring a demodulation reference signal (DM-RS) bundling, and
in case that the DM-RS bundling is configured, power consistency and phase continuity are maintained within the first time domain window.

5. The UE of claim 1, wherein:
the uplink channel is a physical uplink shared channel (PUSCH) with a transport block (TB) processing over multiple slots, and
a start of the first time domain window is a slot where a first part of the TB is transmitted.

6. The UE of claim 1, wherein:
the processor is further configured to identify a duration of a time domain window in number of slots,
the time domain window is associated with the first time domain window or the second time domain window,
in case that information associated with the duration of the time domain window is configured via higher layer signaling, the duration of the time domain window is identified based on the information, and
in case that the information is not configured, the duration of the time domain window is identified based on a number of repetitions of the uplink channel.

7. The UE of claim 1, wherein:
the first time domain window is within first frequency resources, and
the second time domain window is within second frequency resources.

8. The UE of claim 1, wherein:
a duration of a time domain window is in a number of slots,
the time domain window is associated with the first time domain window or the second time domain window,
in case that information associated with the duration of the time domain window is configured via higher layer signaling, the duration of the time domain window is identified based on the information, and
in case that the information is not configured, the duration of the time domain window is identified based on a number of repetitions of the uplink channel.

9. A base station (BS), comprising:
a processor; and
a transceiver operably coupled to the processor and configured to:
receive an uplink channel with repetitions based on a first power within a first time domain window, and
receive the uplink channel with repetitions based on a second power within a second time domain window,
wherein the first power is based on a first power control adjustment state,
wherein the second power is based on a second power control adjustment state,
wherein the second power control adjustment state is determined based on the first power control adjustment state and a first value, and
wherein the first value is based on accumulation of transmit power control (TPC) commands transmitted within the first time domain window.

10. The BS of claim 9, wherein:
the transceiver is further configured to transmit one or more TPC commands after an end of the first time domain window and a start of the second time domain window, and
wherein the second power control adjustment state is further based on a second value obtained by accumulating the one or more TPC commands.

11. The BS of claim 9, wherein:
the TPC commands are provided by a downlink control information (DCI) format that does not schedule the uplink channel, and
a TPC command associated with the first power control adjustment state is provided by a DCI format that schedules the uplink channel.

12. The BS of claim 9, wherein:
the transceiver is further configured to transmit a message for configuring a demodulation reference signal (DM-RS) bundling, and
wherein in case that the DM-RS bundling is configured, power consistency and phase continuity are maintained within the first time domain window.

13. The BS of claim 9, wherein:
the uplink channel is a physical uplink shared channel (PUSCH) with a transport block (TB) processing over multiple slots, and
a start of the first time domain window is a slot where a first part of the TB is transmitted.

14. The BS of claim 9, wherein:
the first time domain window is within first frequency resources, and
the second time domain window is within second frequency resources.

15. A method performed by a user equipment (UE) in a wireless communication system, the method comprising:
transmitting an uplink channel with repetitions based on a first power within a first time domain window,
wherein the first power is determined based on a first power control adjustment state;
determining a first value by accumulating transmit power control (TPC) commands received within the first time domain window;
determining a second power control adjustment state based on the first power control adjustment state and the first value;
determining a second power based on the second power control adjustment state; and
transmitting the uplink channel with repetitions based on the second power within a second time domain window.

16. The method of claim 15, further comprising:
receiving one or more TPC commands after an end of the first time domain window and a start of the second time domain window; and
obtaining a second value by accumulating the one or more TPC commands,
wherein the second power control adjustment state is determined further based on the second value.

17. The method of claim 15, wherein:
the TPC commands are provided by a downlink control information (DCI) format that does not schedule the uplink channel, and
a TPC command associated with the first power control adjustment state is provided by a DCI format that schedules the uplink channel.

18. The method of claim 15, further comprising:
receiving a message for configuring a demodulation reference signal (DM-RS) bundling,
wherein, in case that the DM-RS bundling is configured, power consistency and phase continuity are maintained within the first time domain window.

19. The method of claim 15, wherein:
the uplink channel is a physical uplink shared channel (PUSCH) with a transport block (TB) processing over multiple slots, and
a start of the first time domain window is a slot where a first part of the TB is transmitted.

20. The method of claim 15, further comprising:
identifying a duration of a time domain window in number of slots,
wherein the time domain window is associated with the first time domain window or the second time domain window,
wherein, in case that information associated with the duration of the time domain window is configured via higher layer signaling, the duration of the time domain window is identified based on the information, and
wherein, in case that the information is not configured, the duration of the time domain window is identified based on a number of repetitions of the uplink channel.

* * * * *